(12) United States Patent
Babel

(10) Patent No.: US 12,258,062 B2
(45) Date of Patent: Mar. 25, 2025

(54) INDUSTRIAL TRUCK

(71) Applicant: CROWN EQUIPMENT CORPORATION, New Bremen, OH (US)

(72) Inventor: Christoph Babel, Feldkirchen (DE)

(73) Assignee: CROWN EQUIPMENT CORPORATION, New Bremen, OH (US)

( * ) Notice: Subject to any disclaimer, the term of this patent is extended or adjusted under 35 U.S.C. 154(b) by 637 days.

(21) Appl. No.: 17/673,190

(22) Filed: Feb. 16, 2022

(65) Prior Publication Data

US 2023/0127122 A1    Apr. 27, 2023

Related U.S. Application Data

(63) Continuation of application No. PCT/CN2021/125868, filed on Oct. 22, 2021.

(51) Int. Cl.
*B62B 5/00* (2006.01)
*B62B 3/06* (2006.01)

(52) U.S. Cl.
CPC .......... *B62B 5/0013* (2013.01); *B62B 3/0612* (2013.01)

(58) Field of Classification Search
CPC ............................. B62B 5/0013; B62B 3/0612
See application file for complete search history.

(56) References Cited

U.S. PATENT DOCUMENTS 6,125,971 A * 10/2000 Niebuhr .................... B66F 9/08
                                                            187/222
6,948,739 B2 * 9/2005 Gallagher .............. B62D 51/02
                                                          280/47.11
(Continued)

FOREIGN PATENT DOCUMENTS

CN      101279703 A     10/2008
CN      104210517 A     12/2014
(Continued)

OTHER PUBLICATIONS

International Search Report and Written Opinion pertaining to Application No. PCT/CN2021/125868 dated Jul. 21, 2022, 8 pages.
(Continued)

*Primary Examiner* — Jonathan Snelting
(74) *Attorney, Agent, or Firm* — Dinsmore & Shohl LLP

(57) ABSTRACT

An industrial truck including a drive frame, a load frame liftable with respect to the drive frame, a drive frame cover at least partly covering the drive frame, and a load frame cover at least partly covering the load frame. The drive frame cover includes a curved portion overlapping a load frame cover. The curved portion includes a curvature aligned with a curved movement path of the load frame cover with respect to the drive frame cover. A cover system including a first cover provided for at least partly covering a first part of an industrial truck, and a second cover provided for at least partly covering a second part of the industrial truck and movable with respect to the first part. The first cover includes a curved portion overlapping the second cover. The curved portion includes a curvature aligned with a curved movement path of the second cover.

25 Claims, 18 Drawing Sheets

(56) References Cited

U.S. PATENT DOCUMENTS

| | | | |
|---|---|---|---|
| 6,948,764 B1 * | 9/2005 | Haddock | B60J 11/06 |
| | | | 296/136.07 |
| 9,586,605 B2 * | 3/2017 | He | B62B 3/0612 |
| 11,996,577 B2 * | 5/2024 | Muller | B66F 9/07531 |
| 12,046,769 B2 * | 7/2024 | Xu | H01M 50/244 |
| 2005/0016782 A1 | 1/2005 | Gallagher et al. | |
| 2005/0194813 A1 | 9/2005 | Haddock | |
| 2011/0148087 A1 | 6/2011 | Rosenkranz | |
| 2015/0102274 A1 | 4/2015 | He et al. | |
| 2016/0311670 A1 | 10/2016 | Huether et al. | |

FOREIGN PATENT DOCUMENTS

| | | | |
|---|---|---|---|
| CN | 104540770 A | 4/2015 | |
| CN | 106744522 A | 5/2017 | |
| EP | 2251300 A1 | 11/2010 | |
| JP | 2002293244 A | 10/2002 | |

OTHER PUBLICATIONS

Extended European Search Report dated Mar. 22, 2023 pertaining to European Application No. 22203306.2 filed Jan. 5, 2023.

* cited by examiner

INDUSTRIAL TRUCK

CROSS-REFERENCE TO RELATED APPLICATION

This application is a bypass continuation application of International Patent Application Ser. No. PCT/CN2021/125868 (CRO 2033 WO) filed Oct. 22, 2021, the entire disclosure of which is hereby incorporated herein by reference.

TECHNICAL FIELD

The present invention relates to an industrial truck. In addition, the present invention relates to a cover system and an industrial truck comprising the cover system.

BACKGROUND

Industrial trucks are widely used, for example in storage facilities. An industrial truck may have an electric drive for moving the pallet truck along a travel path. An operator may further steer the industrial truck along the travel path. The industrial truck may have an electric drive for lifting goods to be transported along the travel path. The electric drive for moving the industrial truck and the electric drive for lifting goods may both be powered by a power source, which is arranged on the industrial truck. The electric drive and further operational components of the industrial truck may be covered with cover parts. The arrangement and configuration of such cover parts may influence the work environment of the industrial truck, for example the operational safety of the industrial truck.

Accordingly, it is preferable that the invention at least addresses the foregoing. Preferable features and advantageous characteristics of the invention will become apparent from the general description, the detailed description of embodiments, the claims and the figures.

SUMMARY

An object of the invention can be seen in providing an improved industrial truck as well as an improved cover system.

An aspect of the invention relates to an industrial truck, which comprises a first part and a second part. The second part is movable with respect to the first part. The industrial truck comprises a cover system. The cover system may be provided for at least partly covering the first part and the second part.

A further aspect of the invention relates to a cover system. The cover system may comprise a first cover, which is provided for at least partly covering a first part of an industrial truck. The first cover may be made from metal sheet or may be injection molded. The first cover may be any truck part cover, according to an exemplary embodiment a drive frame cover. The first part may be any truck component, according to an exemplary embodiment a drive frame. The cover system may comprise a second cover, which is provided for at least partly covering a second part of the industrial truck, which is movable with respect to the first part. The second cover may be made from metal sheet or may be injection molded. The second part may be pivotable and/or shiftable with respect to the first part. The second cover may be pivotable and/or shiftable with respect to the first cover. The second cover may be any truck part cover, according to an exemplary embodiment a load frame cover.

The second part may be any truck component, according to an exemplary embodiment a load frame.

The first cover may comprise a curved portion, wherein the curved portion and the second cover may overlap one another. The second cover may overlap the curved portion and vice versa. The curved portion may comprise a curvature, which is aligned with a curved movement path of the second cover with respect to the first cover. The curvature may be functionally or geometrically adapted to the curved movement path. Accordingly, the curvature may reflect or follow the curved movement path or vice versa. According to an exemplary embodiment, the curvature may correspond to the curved movement path or vice versa.

A finding of the inventors, which is underlying the invention, can already be seen in that a relative movement of said parts of an industrial truck results in said curved movement path of the second cover. A further finding of the inventors, which is also underlying the invention, can be seen in that an overlapping arrangement of two cover parts provides an advantageous configuration for an alignment of a cover shape according to the invention. Said alignment may provide at least one of the following advantageous effects of the invention. Still another finding of the inventors, which is also underlying the invention, can be seen in that an alignment of a single cover shape of said two covers may already provide at least one of the following advantageous effects of the invention.

An advantageous effect of the invention may be seen in providing an adaptive cover system, which functionally and/or geometrically adapts to a relative moving state of the second part with respect to the first part. The adaptive cover system may comprise at least the first and second part. Accordingly, a functional or geometrical interrelation between the two parts may adapt to the moving state. The curved portion may thus be functionally or geometrically adapted to the curved movement path.

A further aspect of the invention relates to an industrial truck, which may be configured as a low-lift pallet truck. The industrial truck may comprise a drive frame. The drive frame may be a base frame of the industrial truck. The pallet truck may comprise a load frame, which is liftable with respect to the drive frame. The load frame may be a lift frame of the industrial truck. The load frame may be liftable with respect to the drive frame in a lifting direction. The lifting direction may be a substantially vertical direction in operation of the industrial truck. With respect to a driving direction of the drive frame, the lifting direction may be substantially perpendicular to the driving direction. The load frame may be supported on the drive frame. The industrial truck may comprise a linkage, which interconnects the drive frame and the load frame. The linkage may be pivotably connected to the drive frame and the load frame. The linkage may be a rigid connecting member.

Regarding all embodiments of the invention, the drive frame may correspond to the first part of the respective previous aspect, and vice versa. Alternatively or additionally, regarding all embodiments of the invention, the load frame may correspond to the second part of the respective previous aspect, and vice versa.

The industrial truck may further comprise a drive frame cover, which is provided for at least partly covering the drive frame. The drive frame cover may be made from metal sheet, wherein the drive frame cover may be a stamped steel cover part. The drive frame may be at least partly covered by the drive frame cover. The drive frame cover may be provided for covering a top portion of the drive frame, which may cover the drive frame from above in an operational mode of the industrial truck. The drive frame cover may be provided for covering a lateral portion of the drive frame, which may cover the drive frame laterally in an operational mode of the industrial truck. The lateral portion of the drive frame may face away from a portion of the load frame on which a load handling device is arranged. In the operational mode, the industrial truck may be located on a substantially horizontal travel path. In the operational mode, the industrial truck may be operated for lifting goods in the substantially vertical direction. The industrial truck may further comprise a skirt, which is provided for additionally covering the drive frame. The skirt may be provided for covering a drive wheel support and/or a drive wheel, which may be pivotably supported on the drive frame. The skirt may be arranged below the drive frame cover in the operational mode. The skirt may provide a separate cover part to the drive frame cover.

The industrial truck may further comprise a load frame cover, which is provided for at least partly covering the load frame. The load frame cover may be made from metal sheet, wherein the load frame cover may be a stamped steel cover part. The load frame may be at least partly covered by the load frame cover. The load frame cover may be provided for covering a lateral portion of the load frame, wherein the load frame cover may cover the load frame laterally in the operational mode of the industrial truck. The lateral portion of the load frame may face away from the portion of the load frame on which the load handling device is arranged. The load handling device may comprise a pair of forks for lifting a pallet.

Regarding all embodiments of the invention, the drive frame cover may correspond to the first cover of the respective previous aspect, and vice versa. Alternatively or additionally, regarding all embodiments of the invention, the load frame cover may correspond to the second cover of the respective previous aspect, and vice versa.

The drive frame cover may comprise a curved portion. The curved portion may be provided for covering the lateral portion of the drive frame, which may cover the drive frame laterally in the operational mode of the industrial truck. The curved portion may extend along the lifting direction and the vertical direction, respectively. The curved portion may comprise at least one non-linear section. The curved portion may thus be a non-linear portion of the drive frame cover. The curved portion may comprise at least one of a concave portion of an outer surface of the drive frame cover and a convex portion of the outer surface of the drive frame cover. The curved portion may comprise at least one of an inwardly curved portion of the outer surface and an outwardly curved portion of the outer surface. The outer surface may be a surface of the drive frame, which faces the outer operational environment of the industrial truck. A respective inner surface of the drive frame cover may further be a surface of the drive frame, which faces operational components of the industrial truck, which may be covered. The curved portion may further be part of an elbow section of the drive frame, wherein the curved portion may form an extension of the elbow section. The elbow section may provide an elbow connection of the top portion of the drive frame with the curved portion.

The curved portion and the load frame cover may overlap one another. The load frame cover may overlap the curved portion and vice versa. The curved portion may reach behind or step behind the load frame cover. In the lifting direction, an upper edge of the curved portion may reach or step behind a lower edge of the load frame cover or vice versa. The curved portion and the load frame cover or the upper edge of the curved portion and the lower edge of the load frame cover may comprise a staggered overlapping arrangement. The curved portion may comprise a curvature, which is aligned with a curved movement path of the load frame cover with respect to the drive frame cover. The curvature may be functionally and/or geometrically aligned with the curved movement path. Accordingly and in an advantageous manner, the lower edge of the load frame cover may be the outer step of the staggered overlapping arrangement providing further operational safety due to a low edge position on the cover system.

An advantageous effect of the invention may be seen in providing an adaptive cover system of an industrial truck, which functionally and/or geometrically adapts to a lifting state of the load frame with respect to the drive frame. The adaptive cover system may comprise the drive frame cover and the load frame cover. A functional or geometrical interrelationship between the drive frame cover and the load frame cover may adapt to the lifting state of the load frame with respect to the drive frame. The curved portion may thus be functionally or geometrically adapted to the curved movement path of the load frame cover with respect to the drive frame cover by providing the curvature, which is aligned with the curved movement path of the load frame cover with respect to the drive frame cover. Thus, the curvature may be functionally or geometrically aligned with a curved movement path of the load frame cover with respect to the drive frame cover.

Further advantageous effect of the invention may be seen in providing a dust-proof cover system, which adapts to a lifting state of the load frame with respect to the drive frame. An overlapping between the drive frame cover and the load frame cover may adapt to the lifting state of the load frame with respect to the drive frame for providing a dust-proof sealing of at least one of the load frame and the drive frame.

According to an embodiment of the invention, the curved movement path of the second cover may be effected by a kinematic system of the industrial truck, which interconnects the first cover and the second cover. According to a further embodiment of the invention, the curved movement path of the load frame cover may be effected by a kinematic system, which interconnects the drive frame and the load frame. The kinematic system may (pre-)set the curved movement path, wherein the curved movement path may be caused by the kinematic system. The kinematic system may comprise a lift actuator, which is configured and arranged to lift the second part with respect to the first part or the load frame with respect to the drive frame. The kinematic system may comprise at least one joint or linkage, which interconnects the second part and the first part or the load frame and the drive frame. The joint may be a hinge. Accordingly, the curvature may be functionally or geometrically adjusted to the kinematic system by an alignment of the curvature to the curved movement path.

According to a further embodiment of the invention, the curvature may be aligned with the curved movement path of the second cover for providing a clearance between the curved portion and the second cover. According to a further embodiment of the invention, the curvature may be aligned with the curved movement path of the load frame cover for providing a clearance between the curved portion and the load frame cover. The curved portion may be arranged spaced apart from the second cover or the load frame cover. Alternatively or additionally, the curvature may be aligned with the curved movement path for providing a guidance between the curved portion and the second cover or the load frame cover. Accordingly, the curvature may provide or support a predefined relative movement of the second cover or the load frame cover with respect to the first cover or the drive frame cover, wherein the relative movement may be defined by the curved movement path.

According to a further embodiment of the invention, the curvature may be aligned with the curved movement path of the second cover for providing a clearance distance between the curved portion and the second cover, which does not exceed a predefined safety distance. According to a further embodiment of the invention, the curvature may be aligned with the curved movement path of the load frame cover for providing a clearance distance between the curved portion and the load frame cover, which does not exceed a predefined safety distance. The clearance distance and the safety distance, respectively, may be provided between an edge of the load frame cover and the curved portion. Accordingly and in an advantageous manner, operational safety of the industrial truck and the cover system may be increased by providing said distances.

According to a further embodiment of the invention, the predefined safety distance may be defined by a gap width between the curved portion and the second cover. According to a further embodiment of the invention, the clearance distance or the predefined safety distance may be defined by a gap width between the curved portion and the load frame cover. The gap width may be defined between the edge of the second cover or the load frame cover and the curved portion. According to a further embodiment of the invention, the predefined safety distance may be defined by a diameter of a standardized test finger. The diameter may be derived from a known technical standard, for example ISO/TR 7250-2, ISO 13857 or EN 60529. The diameter may be defined by every respective value between, for example 12 mm or 20 mm. Accordingly, operational safety with respect to a manual operation by an operator of the industrial truck and the cover system may be further increased by avoiding a pinch point for an operator's hand between the curved portion and the second cover or the load frame cover.

According to a further embodiment of the invention, the curved portion may comprise an arcuate portion, which is aligned with an arcuate section of the curved movement path of the load frame cover with respect to the drive frame cover. The arcuate section may be aligned with or effected by an arching motion of the kinematic system, which propagates through a kinematic chain from the kinematic system to an arcuate movement path. According to a further embodiment of the invention, the curved portion may comprise a curved profile in a section of the drive frame cover, which spans a longitudinal extension of the industrial truck. The section may be spanned along a longitudinal axis of the industrial truck. The section may be further spanned in the lifting direction. According to a further embodiment of the invention, the curved profile may comprise an arcuate profile. The arcuate profile may be aligned with or effected by the arching motion of the kinematic system. Further, the arcuate profile may correspond to the arcuate movement path. Accordingly and advantageously, a gap width between the curved portion and the load frame cover may be for example limited according to a predetermined operating or manufacturing tolerance.

According to a further embodiment of the invention, a curved profile of the curved portion may correspond to the curved movement path of the second cover. According to a further embodiment of the invention, the curved profile may correspond to the curved movement path of the load frame cover. According to a further embodiment of the invention, the curved portion may comprise a concave portion of an outer surface of the drive frame cover. Alternatively or additionally, the curved portion may comprise a convex portion of the outer surface of the drive frame cover.

According to a further embodiment of the invention, the curved portion and the second cover may overlap one another in a first moving state and in a second moving state of the second cover with respect to the first cover. According to a further embodiment of the invention, the curved portion and the load frame cover may overlap one another in a low lift state and in a high lift state of the load frame cover with respect to the drive frame cover. The low lift state and the high lift state may span a movement of the load frame with respect to the drive frame. Accordingly, said respective covers may provide an adaptive cover system with an outer operational surface, which avoids an open gap between said respective covers. A dust-proof sealing of the cover system may thus be further enhanced.

According to a further embodiment of the invention, the curved portion and the second cover overlap one another in a plurality of moving states between the first moving state and the second moving state of the second cover with respect to the first cover. The curved portion and the second cover may continuously overlap during the movement of the second cover with respect to the first cover. According to a further embodiment of the invention, the curved portion and the load frame cover may overlap one another in a plurality of lifting states between the low lift state and the high lift state of the load frame cover with respect to the drive frame cover. The curved portion and the load frame cover may continuously overlap during the movement of the load frame with respect to the drive frame. Accordingly and in an advantageous manner, the overlapping of the respective covers may be provided over an entire movement of the second cover or the load frame cover.

According to a further embodiment of the invention, the curved portion may face an inner surface of the load frame cover. The curved portion may thus be a portion of the drive frame cover, which is at least partly covered by the load frame cover. According to a further embodiment of the invention, the curved portion may be accommodated in the load frame. The load frame may comprise a convex hull in which the curved portion may be arranged.

According to a further embodiment of the invention, the curved portion may be intermitted over an extension of the first cover. According to a further embodiment of the invention, the curved portion may be intermitted over a transverse extension of the industrial truck. The curved portion may comprise a recess, which may be a mounting recess.

According to a further embodiment of the invention, the cover system may comprise a supplementary cover, which is arranged at the first cover. The supplementary cover and the first cover may each comprise at least one attachment member, which may be configured for providing a toolless attachment of the supplementary cover to the first cover. The attachment members may be covered by the supplementary cover in an attached condition of the supplementary cover to the first cover. The supplementary overlap portion and the second cover may overlap one another. According to a further embodiment of the invention, the industrial truck may comprise a supplementary cover, which may be arranged at a recess of the drive frame cover. The recess may be the recess of the curved portion. The supplementary cover may comprise a supplementary overlap portion. The supplementary overlap portion may be curved and may be further configured as the curved portion. At least a part of the supplementary overlap portion and the load frame cover may overlap one another. The supplementary cover may be provided for covering the mounting recess. According to a further embodiment of the invention, the supplementary overlap portion may face an inner surface of the load frame cover. According to a further embodiment of the invention, the supplementary overlap portion and the curved frame portion of the load frame cover may overlap one another. Accordingly, the supplementary cover may thus provide a covered cable routing inside the drive frame and/or the load frame. Furthermore, the supplementary cover may supplement an alignment with the curved movement path and a dust-proofness of the cover system.

According to a further embodiment of the invention, the load frame cover may comprise a curved frame portion. According to a further embodiment of the invention, the load frame cover may comprise a depression, which may be configured for providing a movement of a tiller of the industrial truck with respect to the load frame cover. The curved frame portion of the load frame cover may be configured as the curved portion of the drive frame cover.

Embodiments and features of one aspect of the invention may constitute embodiments and features of any other aspect of the invention.

DETAILED DESCRIPTION

Figure 1:
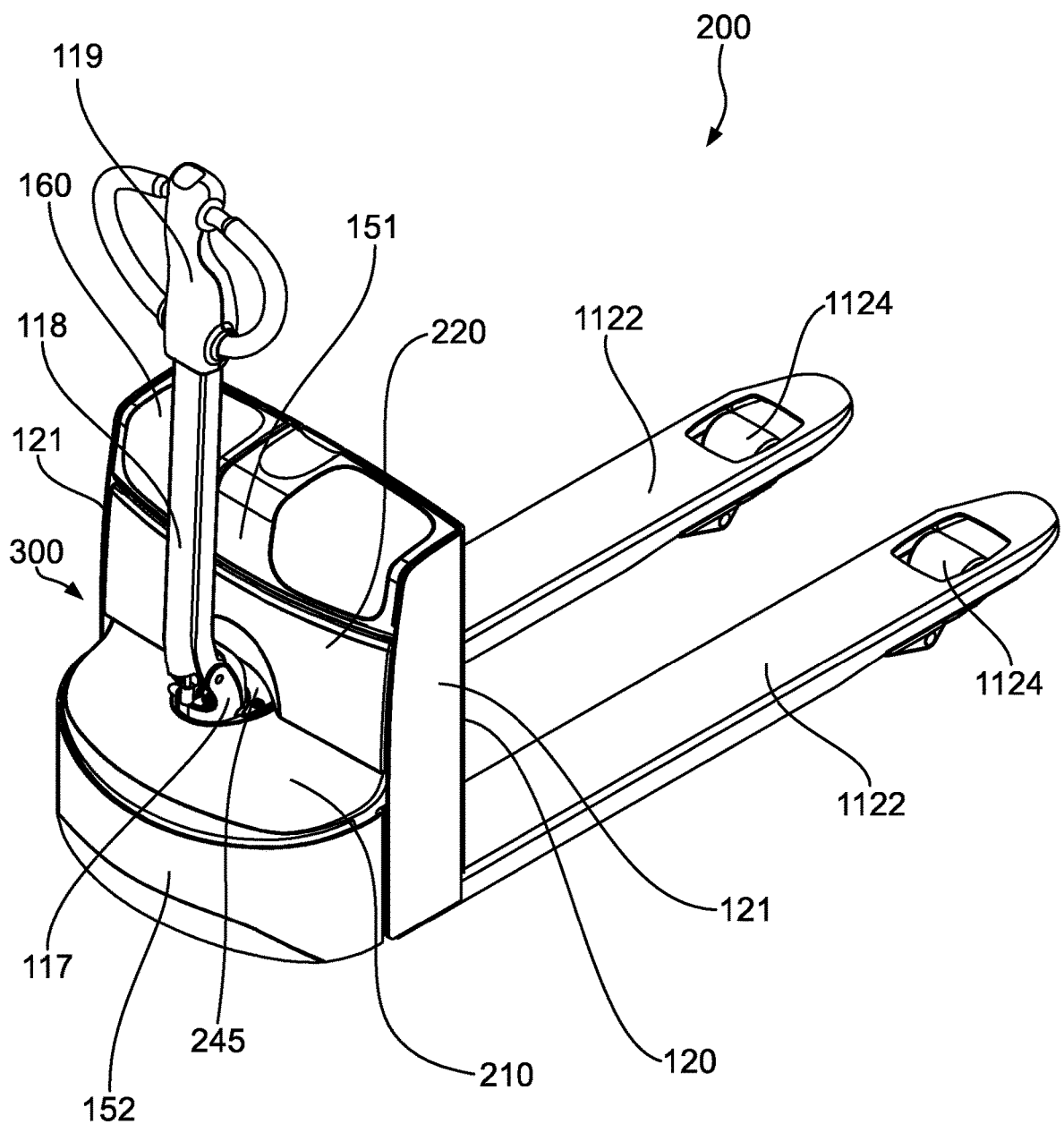
FIG. 1 shows an industrial truck with a cover system according to respective embodiments of the invention in a perspective view.

FIG. 1 shows an industrial truck 200 in a perspective view. The industrial truck 200 may be configured as a low-lift pallet truck. The industrial truck 200 comprises a load frame 120, which is liftable. The industrial truck 200 further comprises a pair of forks 1122, which is arranged at the load frame 120. The pair of forks 1122 is mounted on a bottom part of the load frame 120. The pair of forks 1122 is configured to engage a pallet. At a front portion of the pair of forks 1122, which is opposite to an attachment portion of the pair of forks 1122, carrying wheels 1124 are arranged.

Figure 3:
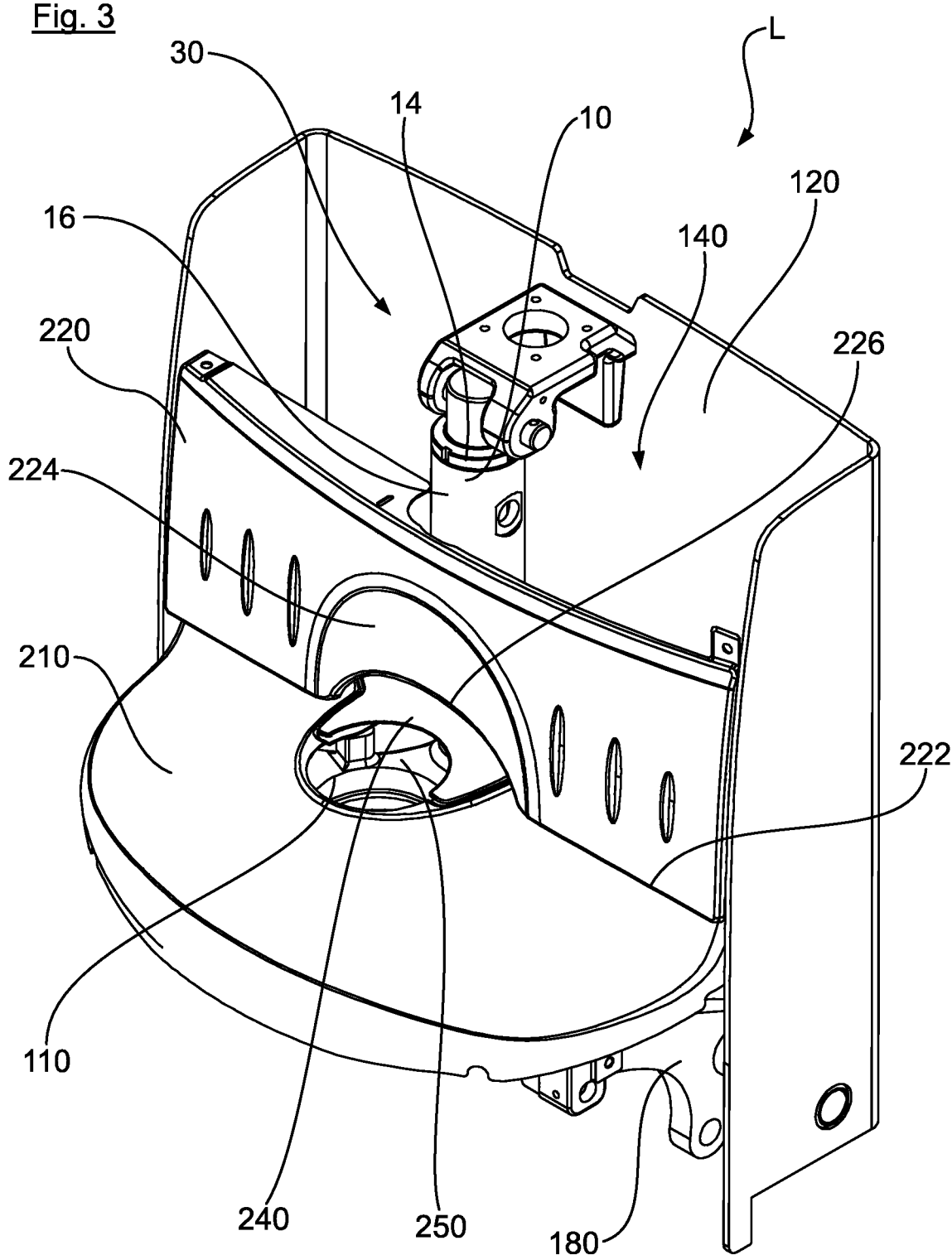
FIG. 3 shows the cover system of FIG. 1 in a perspective view and in a low lift state of a load frame of the industrial truck with respect to a drive frame of the industrial truck for further explanation of the invention.

The load frame 120 may comprise lateral frame parts 121, wherein the load frame 120 may have a horizontal section, which may have a U-shape. A lateral open side of the load frame 120 may be covered by a cover system 300, which is arranged on the load frame 120. The cover system 300 comprises a drive frame cover 210 and a load frame cover 220, wherein the load frame cover 220 is liftable together with the load frame 120 with respect to the drive frame cover 210. The load frame 120 and the cover system 300 may enclose an inner mounting space 140, which is shown in FIG. 3. The cover system 300 may be arranged flush with the lateral frame parts 121. The industrial truck 200 may further comprise a skirt 152, which covers a drive unit of the industrial truck 200. The skirt 152 may be arranged flush with the cover system 300. The industrial truck 200 may further comprise an upper cover part 151, which further covers the load frame 120 at a top open side of the load frame 120. The upper cover part 151 may be arranged flush with the cover system 300 and the lateral frame parts 121.

The industrial truck 200 further comprises a drive frame 110 shown in FIG. 3 on which a tiller joint 117 is arranged. The cover system 300 may further comprise a joint cover 245, which may be arranged on the drive frame 110, wherein the joint cover 245 at least partly covers the tiller joint 117. The tiller joint 117 connects a tiller 118 for steering the industrial truck 200 with the drive unit. A tiller head 119 for manually steering the industrial truck 200 is attached to a distal end of the tiller 118 opposite to a proximal end of the tiller 118, which is pivotably articulated with the tiller joint 117. The industrial truck 200 further comprises a battery pack 160, which is arranged at the load frame 120. The battery pack 160 may be arranged in the inner mounting space 140 of the load frame 120. The battery pack 160 may be arranged flush with the cover system 300.

Figure 2:
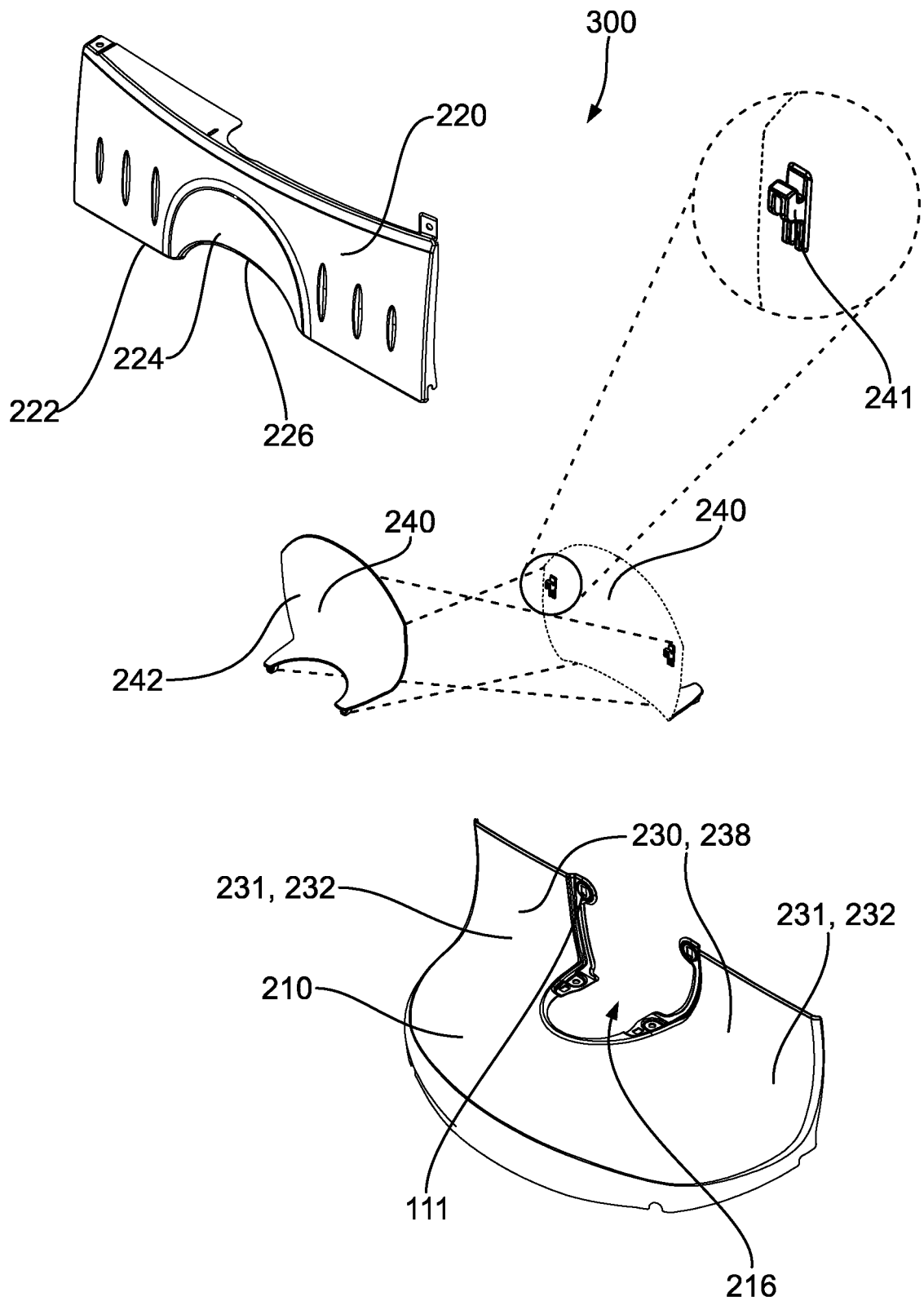
FIG. 2 shows the cover system of FIG. 1 in an exploded view.

FIG. 2 shows the cover system 300 in an exploded view. The cover system 300 comprises the drive frame cover 210, which covers the drive frame 110. The drive frame cover 210 may be attached to the drive frame 110. The cover system 300 further comprises the load frame cover 220, which covers the load frame 120. The load frame cover 220 may be attached to the load frame 120. The drive frame cover 210 comprises a curved portion 230, which comprises a curvature 238. The curved portion 230 is intermitted by a recess 216, which may divide the curved portion 230 in two parts. The outer surface 231 of the drive frame cover 210 being arranged on the drive frame 110 comprises a concave portion 232. The curved portion 230 may thus be curved inwards. The load frame cover 220 comprises a depression 224, which provides a movement of the tiller 118 with respect to the load frame cover 220. The depression 224 may further provide the arrangement of the tiller joint 117. The load frame cover 220 further comprises an inlet 226, which may be arranged at the depression 224. The inlet 226 may further provide the arrangement of the tiller joint 117. The load frame cover 220 comprises a cover edge 222, wherein the cover edge 222 may be a lower cover edge of the load frame cover 220 being arranged on the industrial truck 200. The cover edge 222 may comprise an outer edge of the inlet 226. The cover edge 222 may further comprise an outer edge of the depression 224.

The cover system 300 further comprises a supplementary cover 240, which is arranged at the recess 216 and/or the inlet 226 in a common arrangement on the industrial truck 200. The supplementary cover 240 comprises a supplementary overlap portion 242. The supplementary cover 240 may also comprise at least one hook member 241, which is configured for providing a toolless attachment of the supplementary cover 240 to the drive frame cover 210. The hook member 241 may be hooked into a hook-in member 111, which is arranged on the drive frame cover 210. In an attached condition of the supplementary cover 240 to the drive frame cover 210, as for example shown in FIG. 3, the supplementary cover 240 covers the hook member 241 and the hook-in member 111, wherein the hook member 241 is hooked into the hook-in member 111.

Figure 4:
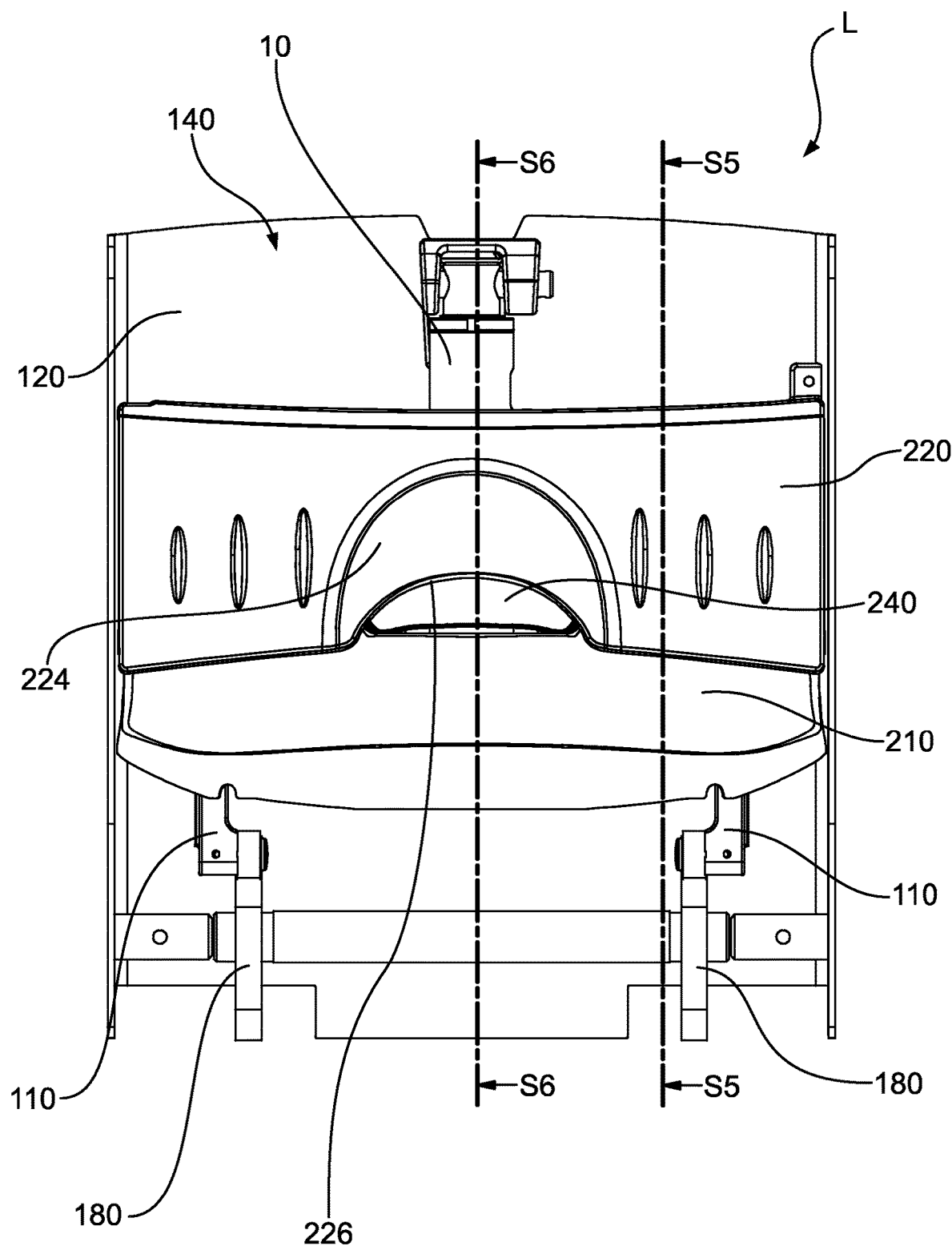
FIG. 4 shows the cover system according to the state of FIG. 3 in a side view.

FIG. 3 and FIG. 4 show the cover system 300 in a low lift state L, which may be a minimum lifting state of the load frame 120 of the industrial truck 200 with respect to the drive frame 110. The load frame 120 may be supported on the drive frame 110 by a hydraulic lift cylinder 10, which may interconnect the load frame 120 and the drive frame 110. In the low lift state L, the hydraulic lift cylinder 10 may be in a retracted state, for example a fully retracted state. A stroke length of the piston rod 18 of the hydraulic lift cylinder 10 in the retracted state may be for example 0 mm. The load frame 120 is liftable with respect to the drive frame 110, wherein a respective lifting of the load frame 120 is effected by the hydraulic lift cylinder 10. A cylinder barrel 16 of the hydraulic lift cylinder 10 may be arranged to the drive frame 110. A hinge 30 may pivotably interconnect the cylinder barrel 16 and the load frame 120. The cylinder barrel 16 may comprise a cap end 14 being attached to the cylinder barrel 16, wherein the hinge 30 may pivotably interconnect the cap end 14 and the load frame 120. In the low lift state L, the curved portion 230 and the load frame cover 220 overlap one another. The curved portion 230 is accommodated in the load frame 120. The curved overlap portion 230 engages behind the load frame cover 220. Regarding the supplementary cover 240, which is arranged on the drive frame 110, the supplementary overlap portion 242 and the load frame cover 220 may overlap one another. The supplementary overlap portion 242 may engage behind the load frame cover 220.

The drive frame 110 comprises a steering seat 250 on which the drive unit may be arranged. The hydraulic lift cylinder 10 may be supported on the steering seat 250, wherein a piston rod 18 of the hydraulic lift cylinder 10 may extend downwards and may be accommodated in the steering seat 250. The drive frame 110 may further comprise a connecting link 180, which pivotably interconnects the drive frame 110 and the load frame 120.

Figure 5:
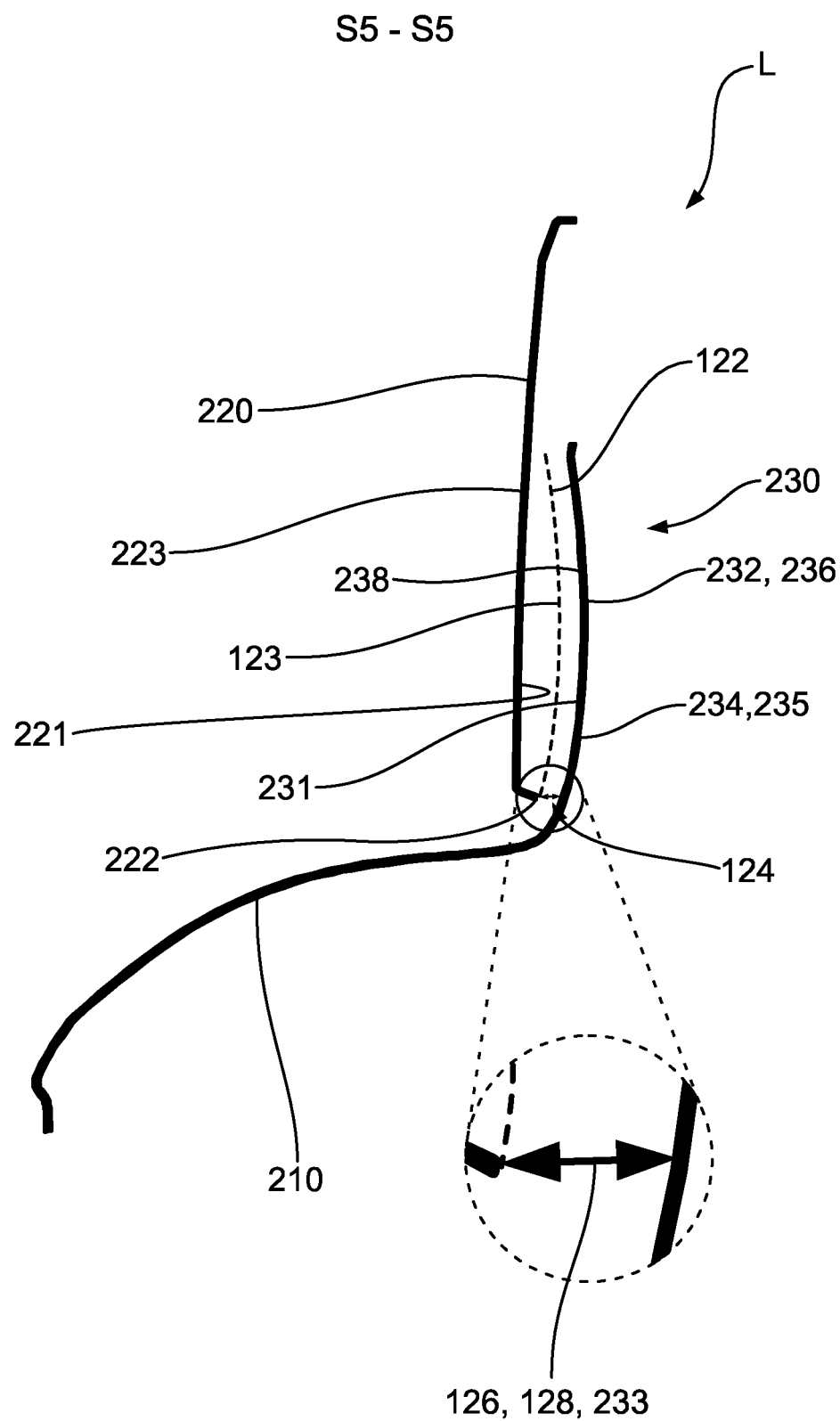
FIG. 5 shows the cover system according to the state of FIG. 3 in a sectional view.

FIG. 5 shows a sectional view of the load frame cover 220 and the drive frame cover 210 in a section S5-S5 indicated in FIG. 4. The section S5-S5 cuts the load frame cover 220 and the drive frame cover 210 in a longitudinal extension of the industrial truck 200. The section S5-S5 is cut with an offset to a longitudinal axis of the industrial truck 200. The section S5-S5 may be further defined by an upright axis of the industrial truck 200. The curved portion 230 faces an inner surface 221 of the load frame cover 220 and comprises a concave portion 232 of an outer surface 231 of the drive frame cover 210. The curved portion 230 comprises the curvature 238, which is aligned with a curved movement path 122 of the load frame cover 220 with respect to the drive frame cover 210. The curvature 238 may correspond to the curved movement path 122. The curved movement path 122 indicated by a dashed line in FIG. 5 may be aligned with the movement path of the cover edge 222 in a lifting movement of the load frame cover 220 with respect to the drive frame cover 210. The curved movement path 122 indicated by a dashed line in FIG. 5 may correspond to the movement path of the cover edge 222 in the lifting movement of the load frame cover 220 with respect to the drive frame cover 210. The curvature 238 is aligned with or may correspond to the curved movement path 122 such that a clearance 124 is provided between the curved portion 230 and the load frame cover 220. The clearance 124 results in that the cover edge 222 does not touch the curved portion 230 in the lifting movement of the load frame cover 220 with respect to the drive frame cover 210. The curvature 238 is aligned with or may correspond to the curved movement path 122 of the load frame cover 220 such that a clearance distance 126 between the curved portion 230 and the load frame cover 220 is provided. The clearance distance 126 may not exceed a predefined safety distance 128 defined by the diameter of a standardized test finger. The predefined safety distance 128 is defined by a gap width 233 between the curved portion 230 and the cover edge 222 and the load frame cover 220, respectively. The curved portion 230 comprises an arcuate portion 236, which is aligned with or may correspond to an arcuate section 123 of the curved movement path 122 of the load frame cover 220 with respect to the drive frame cover 210. The curved portion 230 comprises a curved profile 234 in the section of the drive frame cover 210, wherein the curved profile 234 comprises an arcuate profile 235. The curved profile 234 may be aligned with or may correspond to the curved movement path 122. The curved profile 234 may be aligned with or may correspond to the curved movement path 122 of the load frame cover 220. The load frame cover 220 may comprise a curved frame portion 223, which may have an opposite curvature with respect to the curvature 238 of the curved portion 230 of the drive frame cover 210.

Figure 6:
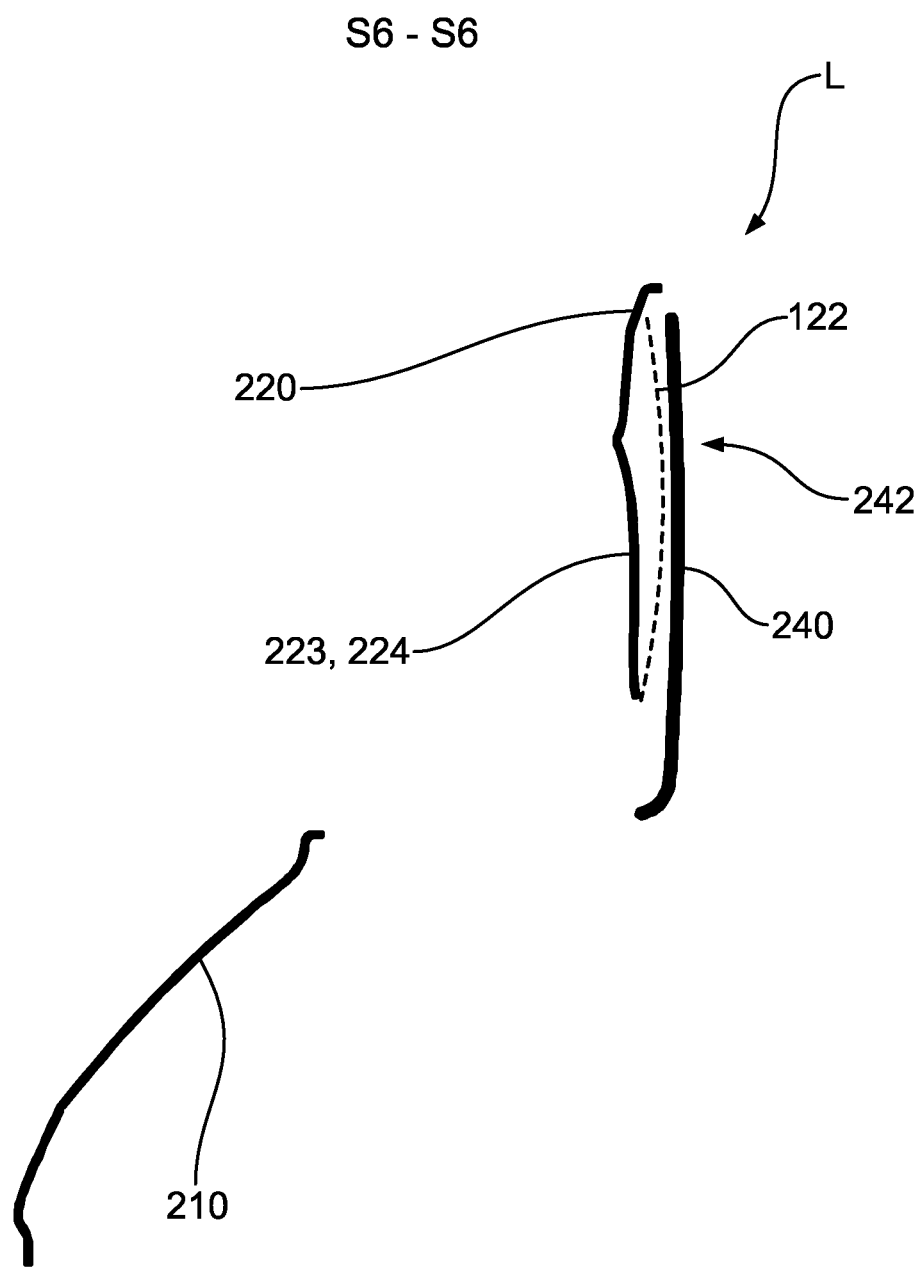
FIG. 6 shows the cover system according to the state of FIG. 3 in a further sectional view.

FIG. 6 shows a further sectional view of the load frame cover 220 and the drive frame cover 210 in a section S6-S6 further indicated in FIG. 4. The section S6-S6 cuts the load frame cover 220 and the drive frame cover 210 in the longitudinal extension of the industrial truck 200. The section S6-S6 is cut along a longitudinal axis of the industrial truck 200. The section S6-S6 may be further defined by the upright axis of the industrial truck 200. The load frame cover 220 comprises the curved frame portion 223, which is arranged at the depression 224. The supplementary cover 240 comprises the supplementary overlap portion 242, which overlaps the load frame 220. The supplementary overlap portion 242 and the curved frame portion 223 overlap one another. The supplementary overlap portion 242 faces an inner surface 221 of the load frame cover 220. The supplementary overlap portion 242 may be configured as the curved portion 230 for providing clearance 124 between the supplementary overlap portion 242 and the load frame cover 220. Accordingly, the curved movement path 122 of the load frame cover 220 does not collide with the supplementary overlap portion 242.

Figure 7:
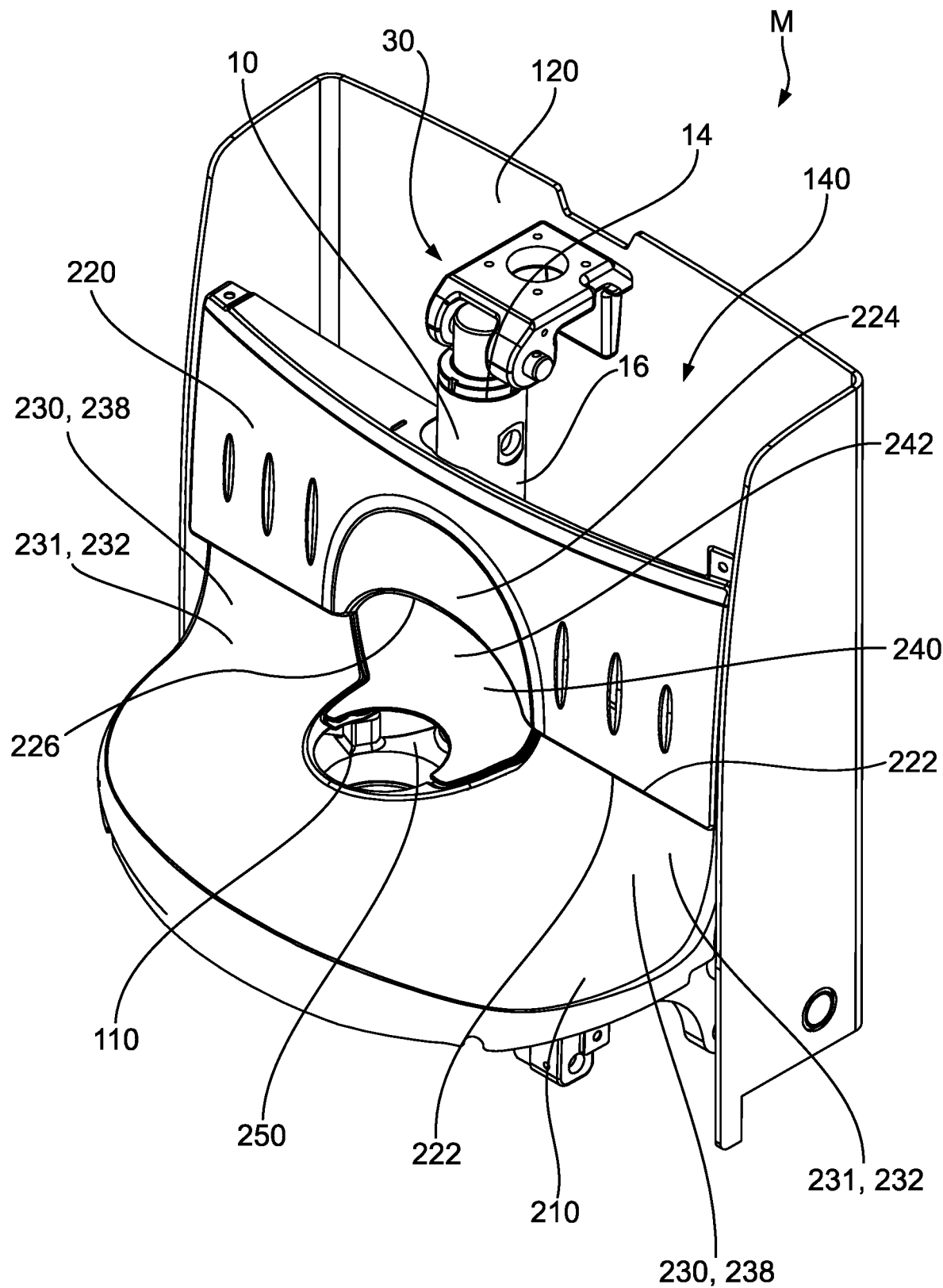
FIG. 7 shows the cover system of FIG. 1 in a perspective view and in a medium lift state of the load frame of the industrial truck with respect to the drive frame of the industrial truck for further explanation of the invention.
Figure 8:
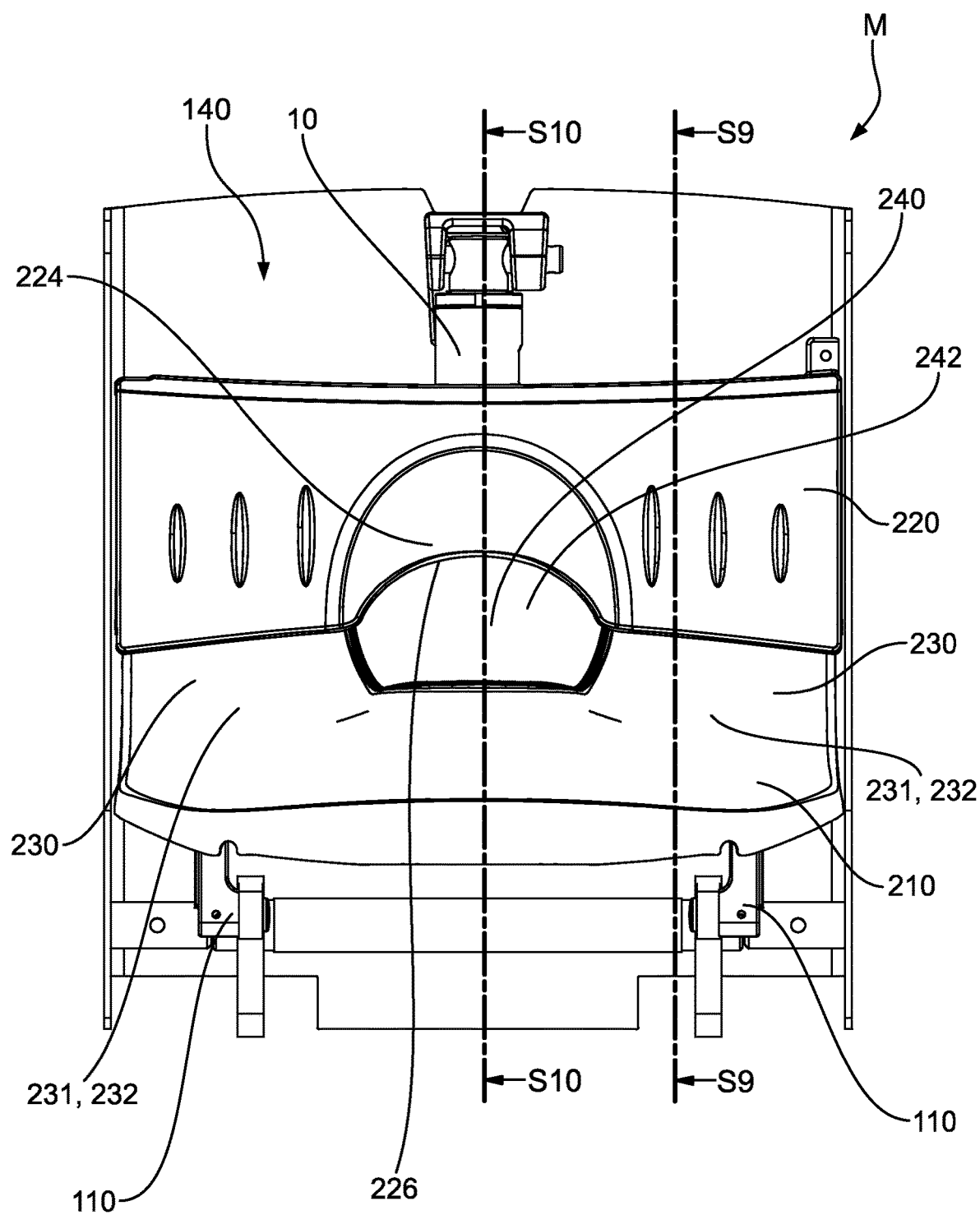
FIG. 8 shows the cover system according to the state of FIG. 7 in a side view.

FIG. 7 and FIG. 8 show the cover system 300 in a medium lift state M of the load frame 120 of the industrial truck 200 with respect to the drive frame 110, for example a half lifting state of the load frame 120 of the industrial truck 200 with respect to the drive frame 110. In the medium lift state M, the hydraulic lift cylinder 10 may be in a medium extracted state, for example a half-extracted state. A stroke length of the piston rod 18 of the hydraulic lift cylinder 10 in the medium extracted state may be for example 63.5 mm. In the medium lift state M, the curved portion 230 and the load frame cover 220 overlap one another. In between the low lift state L and the medium lift state M, the curved portion 230 and the load frame cover 220 may overlap one another in a plurality of intermediate lift states. The curved portion 230 is accommodated in the load frame 120. The curved overlap portion 230 engages behind the load frame cover 220. Regarding the supplementary cover 240, which is arranged on the drive frame 110, the supplementary overlap portion 242 and the load frame cover 220 may overlap one another. The supplementary overlap portion 242 may engage behind the load frame cover 220. In the medium lift state M, the curvature 238 and the outer surface 231 of the drive frame cover 210, which comprises the concave portion 232 is partly exposed.

Figure 9:
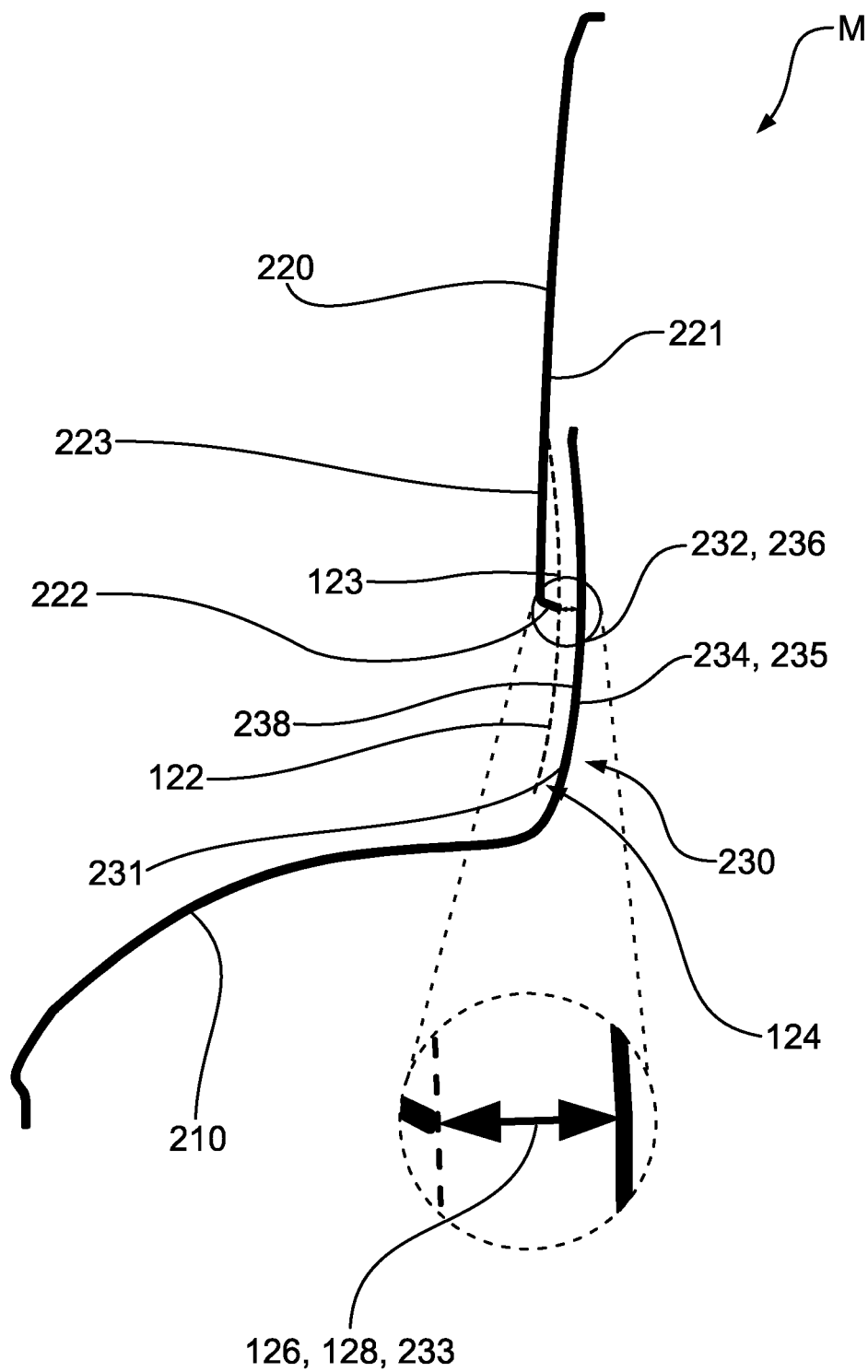
FIG. 9 shows the cover system according to the state of FIG. 7 in a sectional view.

FIG. 9 shows a sectional view of the load frame cover 220 and the drive frame cover 210 in a section S9-S9 indicated in FIG. 8. The section S9-S9 cuts the load frame cover 220 and the drive frame cover 210 in the longitudinal extension of the industrial truck 200. The section S9-S9 is cut with an offset to the longitudinal axis of the industrial truck 200. The section S9-S9 may be further defined by the upright axis of the industrial truck 200. The medium lift state M differs from the low lift state L in FIG. 5 in that the load frame 120 together with the cover edge 222 has been moved along the curved movement path 122. The cover edge 222 has followed the curved movement path 122 and is still located on the same. The relative configuration of the load frame 120 and lift frame 110 as described with respect to the low lift state L may still apply to the configuration of the relative configuration of the load frame 120 and lift frame 110 in the medium lift state M. The clearance distance 126 provided in the medium lift state M may correspond to the clearance distance 126 provided in the low lift state L. This results from the curved portion 230, which is aligned with the curved movement path 122.

Figure 10:
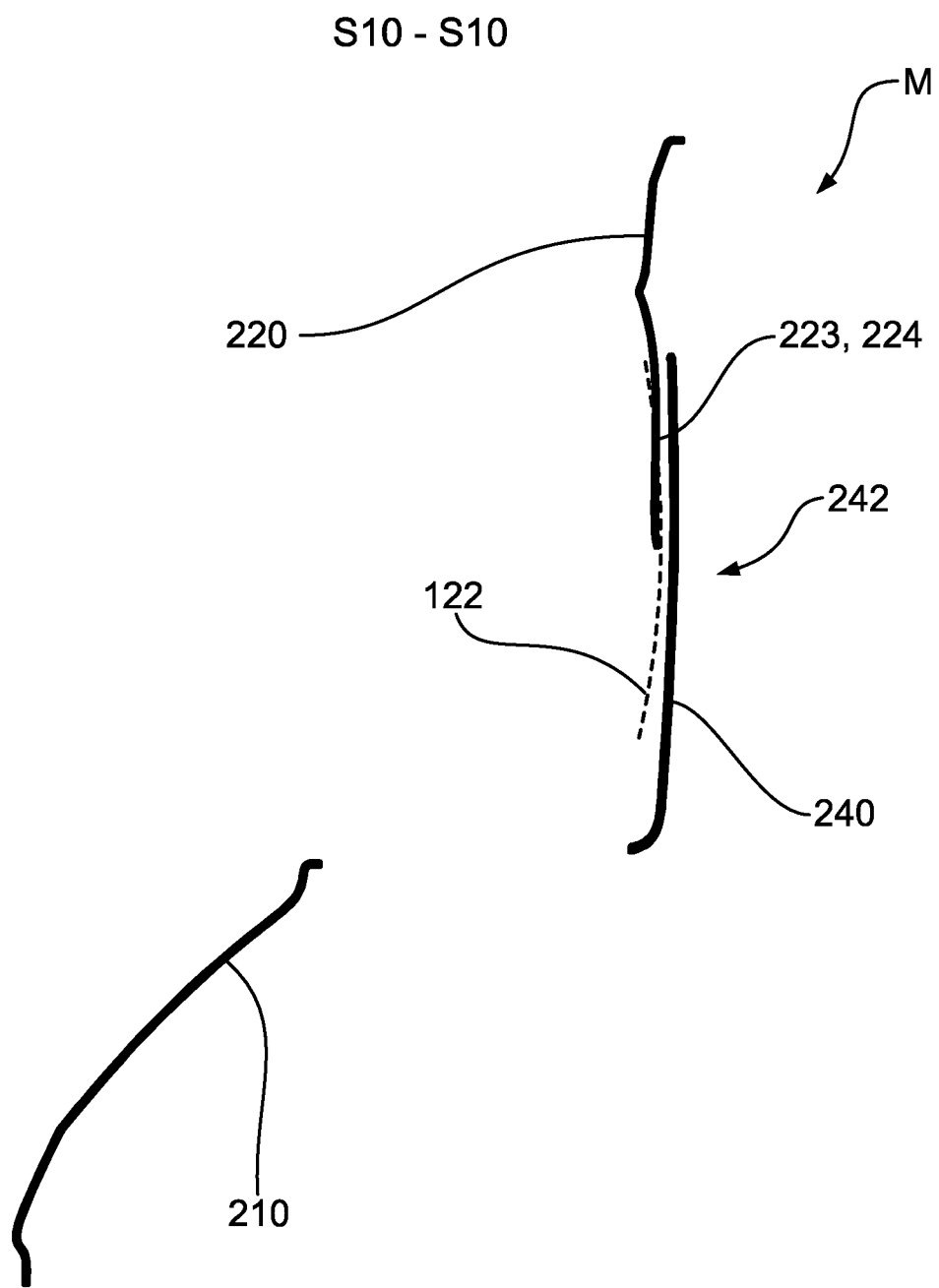
FIG. 10 shows the cover system according to the state of FIG. 7 in a further sectional view.

FIG. 10 shows a further sectional view of the load frame cover 220 and the drive frame cover 210 in a section S10-S10 further indicated in FIG. 8. The section S10-S10 cuts the load frame cover 220 and the drive frame cover 210 in the longitudinal extension of the industrial truck 200. The section S10-S10 is cut along the longitudinal axis of the industrial truck 200. The section S10-S10 may be further defined by the upright axis of the industrial truck 200. The clearance 124 between the supplementary overlap portion 242 and the load frame cover 220 may still be provided as compared to the low lift state L. Accordingly, the curved movement path 122 of the load frame cover 220 does further not collide with the supplementary overlap portion 242.

Figure 11:
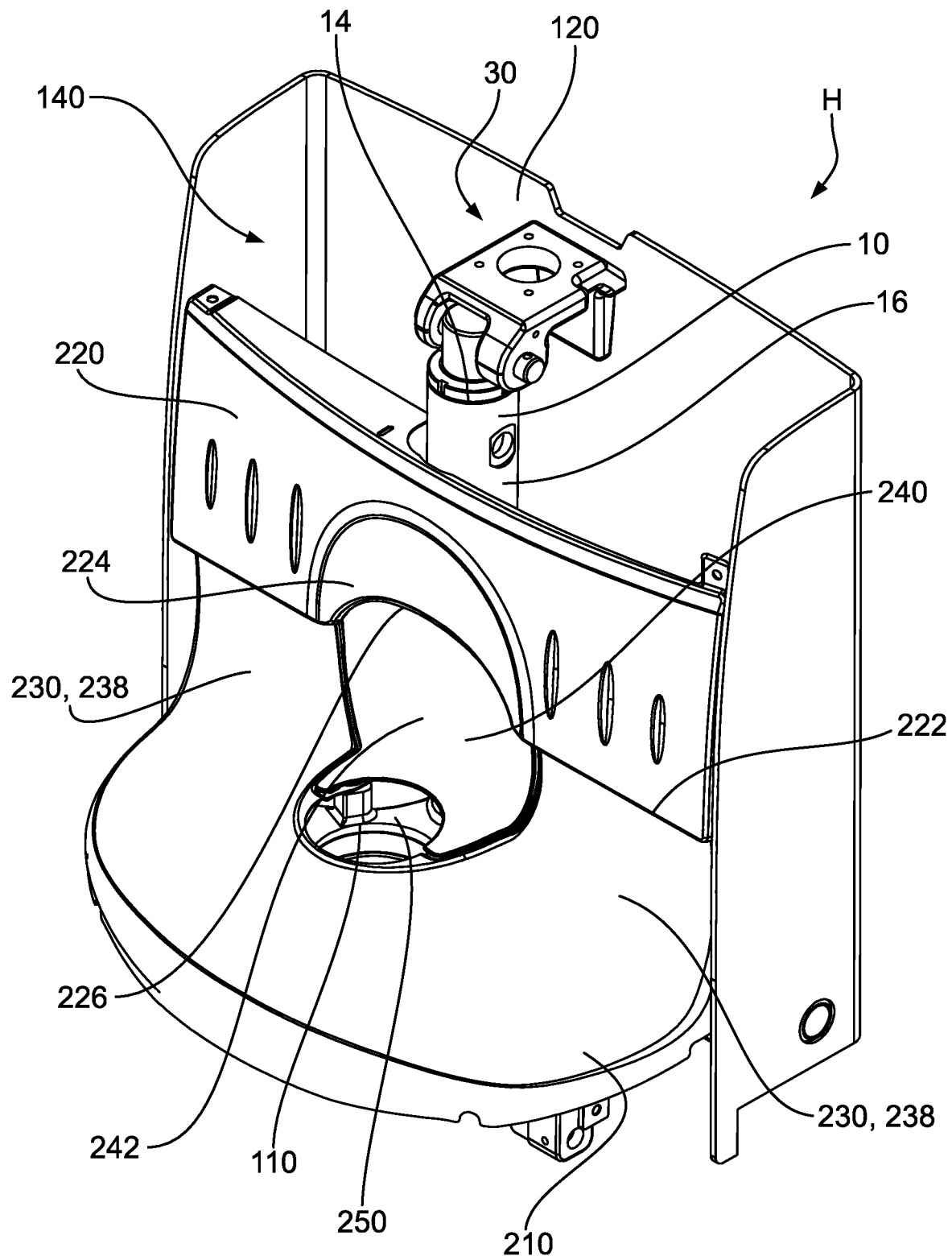
FIG. 11 shows the cover system of FIG. 1 in a perspective view and in a high lift state of the load frame of the industrial truck with respect to the drive frame of the industrial truck for further explanation of the invention.
Figure 12:
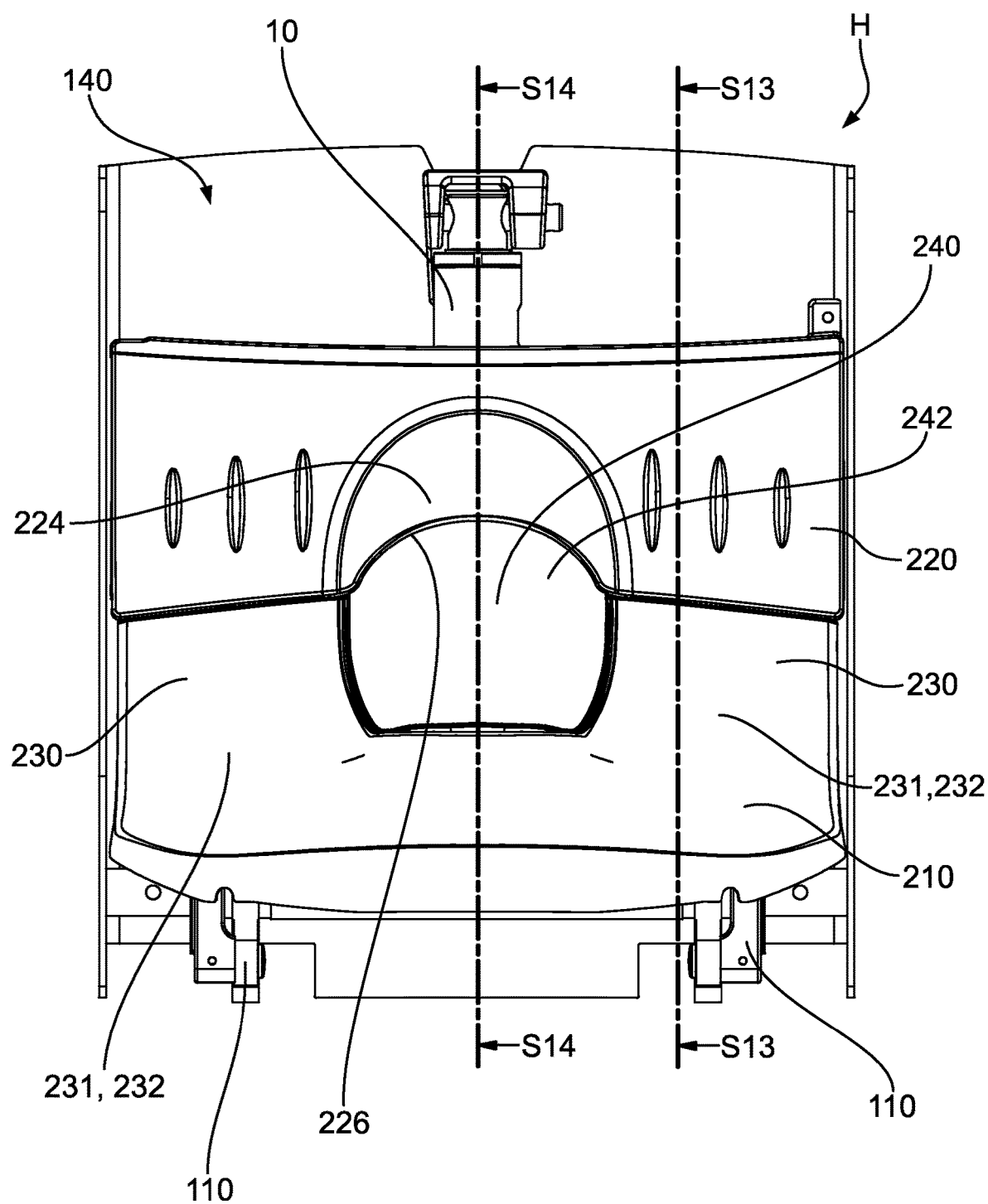
FIG. 12 shows the cover system according to the state of FIG. 11 in a side view.

FIG. 11 and FIG. 12 show the cover system 300 in a high lift state H of the load frame 120 of the industrial truck 200 with respect to the drive frame 110, for example a maximum lifting state of the load frame 120 of the industrial truck 200 with respect to the drive frame 110. In the high lift state H, the hydraulic lift cylinder 10 may be in an extracted state, for example a maximum extracted state. A stroke length of the piston rod 18 of the hydraulic lift cylinder 10 in the extracted state may be for example 127 mm. In the high lift state H, the curved portion 230 and the load frame cover 220 overlap one another. In between the low lift state L or the medium lift state M and the high lift state H the curved portion 230 and the load frame cover 220 may overlap one another in a plurality of intermediate lift states. The curved portion 230 is accommodated in the load frame 120. The curved overlap portion 230 engages behind the load frame cover 220. Regarding the supplementary cover 240, which is arranged on the drive frame 110, the supplementary overlap portion 242 and the load frame cover 220 may overlap one another. The supplementary overlap portion 242 may engage behind the load frame cover 220. In the high lift state H, the curvature 238 and the outer surface 231 of the drive frame cover 210, which comprises the concave portion 232 is exposed, for example completely exposed.

Figure 13:
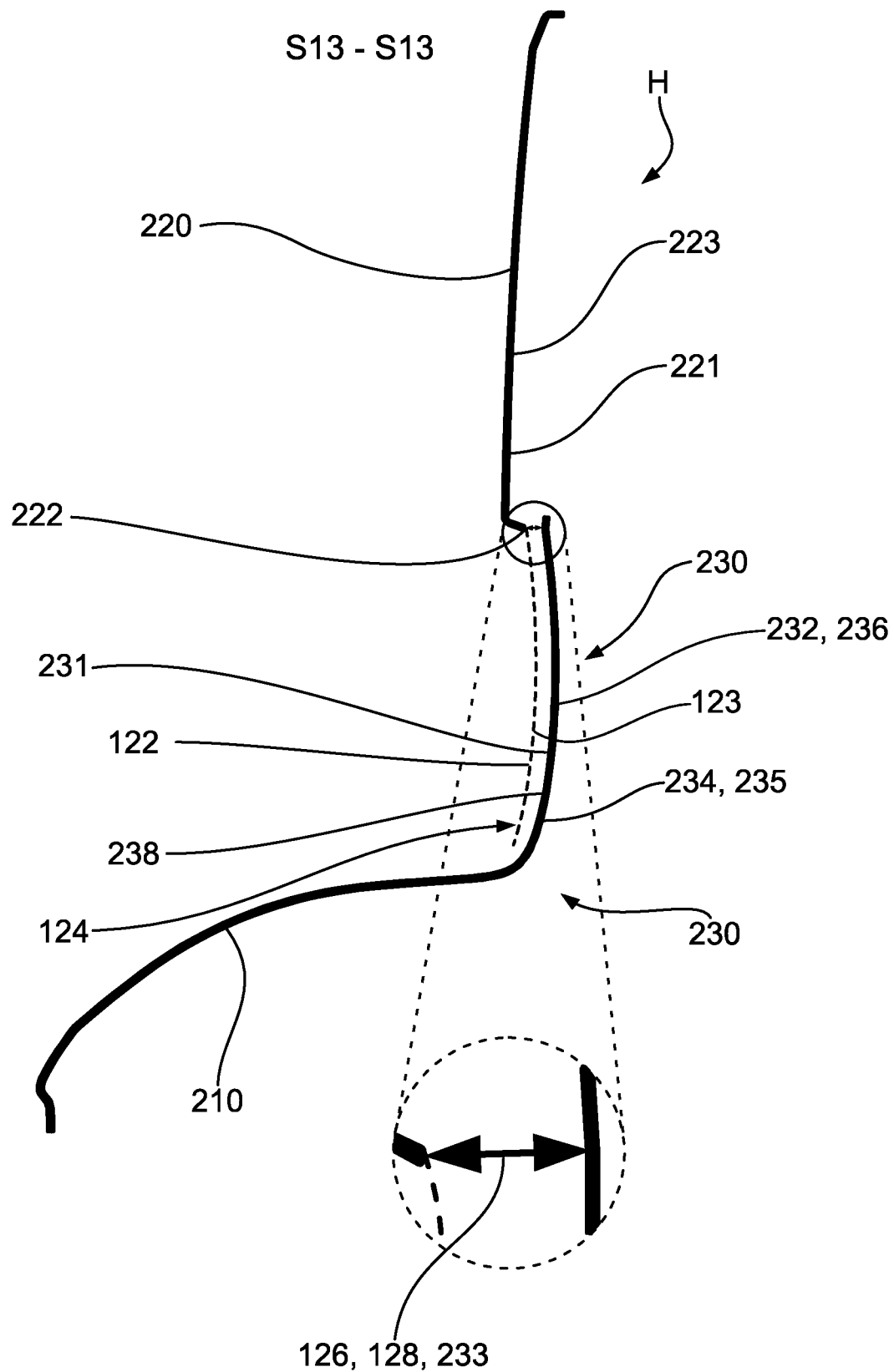
FIG. 13 shows the cover system according to the state of FIG. 11 in a sectional view.

FIG. 13 shows a sectional view of the load frame cover 220 and the drive frame cover 210 in a section S13-S13 indicated in FIG. 12. The section S13-S13 cuts the load frame cover 220 and the drive frame cover 210 in the longitudinal extension of the industrial truck 200. The section S13-S13 is cut with an offset to the longitudinal axis of the industrial truck 200. The section S13-S13 may be further defined by the upright axis of the industrial truck 200. The high lift state H differs from the low lift state L in FIG. 5 and the medium lift state M in FIG. 9 in that the load frame 120 together with the cover edge 222 has been moved further along the curved movement path 122. The cover edge 222 has followed the curved movement path 122 and is still located on the same, for example at the end of the curved movement path 122. The relative configuration of the load frame 120 and lift frame 110 as described with respect to the low lift state L and with respect to the medium lift state M may still apply to the configuration of the relative configuration of the load frame 120 and lift frame 110 in the medium lift state M. The clearance distance 126 provided in the high lift state H may correspond to the clearance distance 126 provided in the low lift state L and the medium lift state M. This results from the curved portion 230, which is still aligned with the curved movement path 122.

Figure 14:
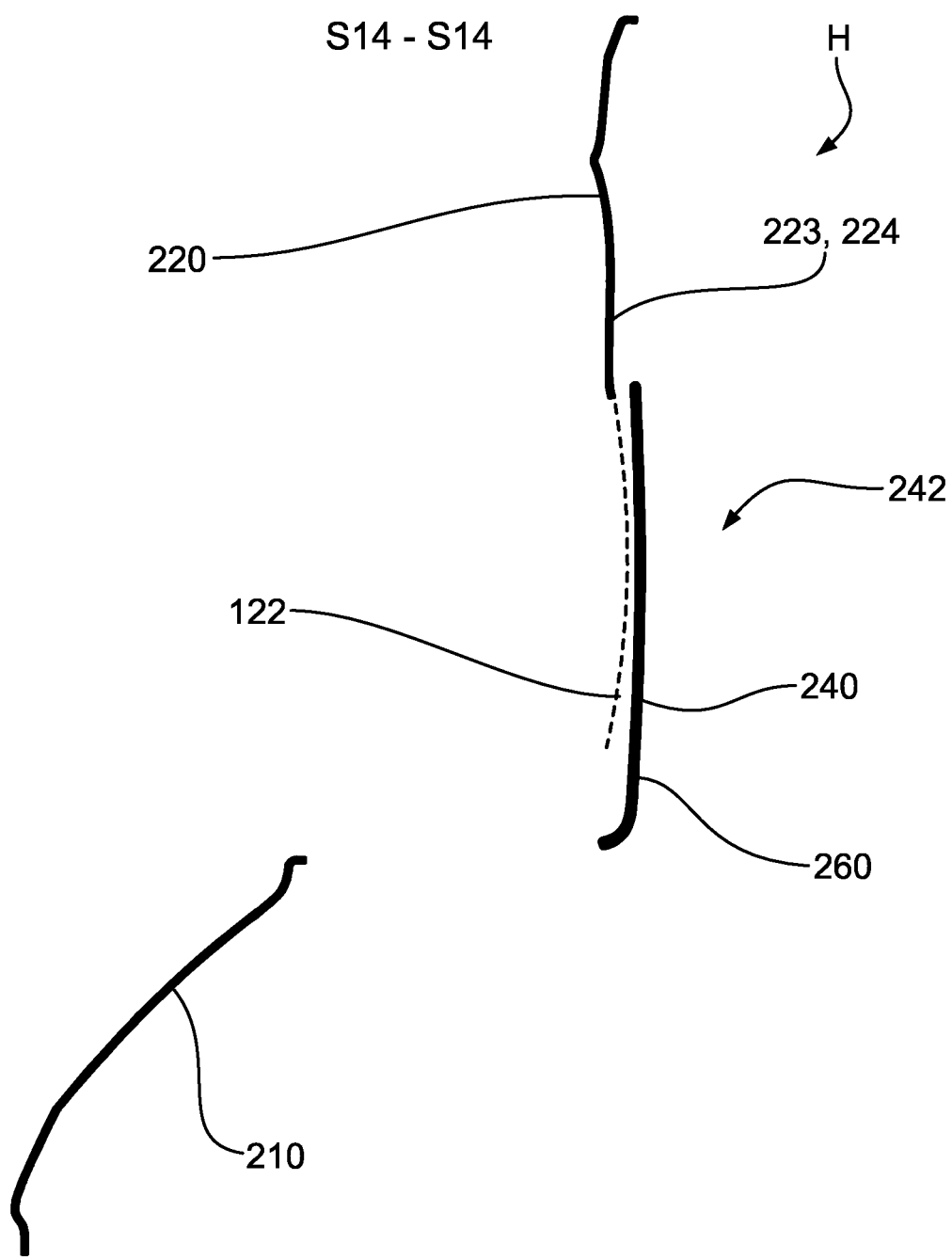
FIG. 14 shows the cover system according to the state of FIG. 11 in a further sectional view.

FIG. 14 shows a further sectional view of the load frame cover 220 and the drive frame cover 210 in a section S14-S14 further indicated in FIG. 12. The section S14-S14 cuts the load frame cover 220 and the drive frame cover 210 in the longitudinal extension of the industrial truck 200. The section S14-S14 is cut along the longitudinal axis of the industrial truck 200. The section S14-S14 may be further defined by the upright axis of the industrial truck 200. The clearance 124 between the supplementary overlap portion 242 and the load frame cover 220 may still be provided as compared to the low lift state L and the medium lift state M. Accordingly, the curved movement path 122 of the load frame cover 220 does further still not collide with the supplementary overlap portion 242.

Figure 15:
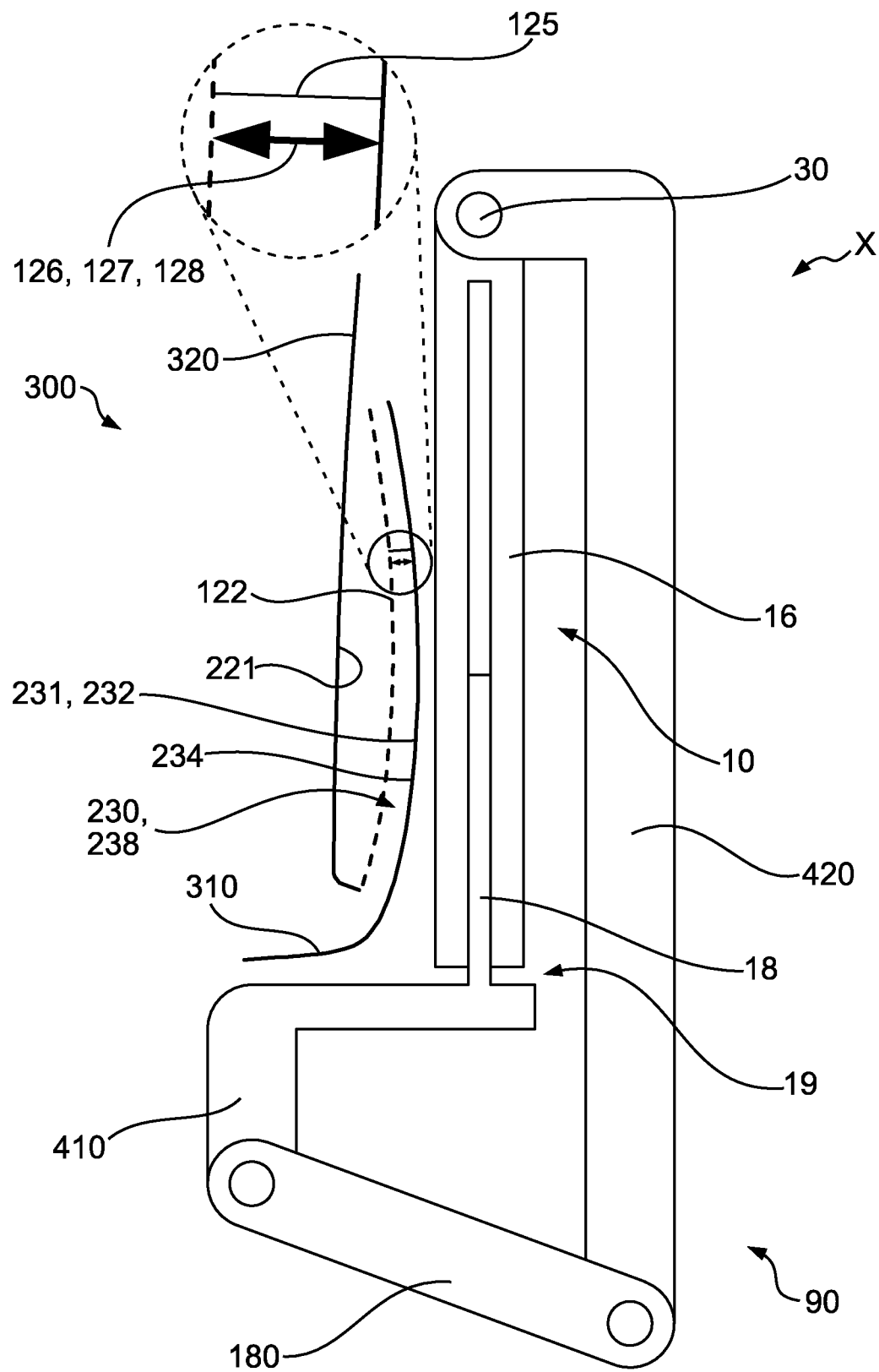
FIG. 15 shows a cover system according to an embodiment of the invention in a schematic view.
Figure 16:
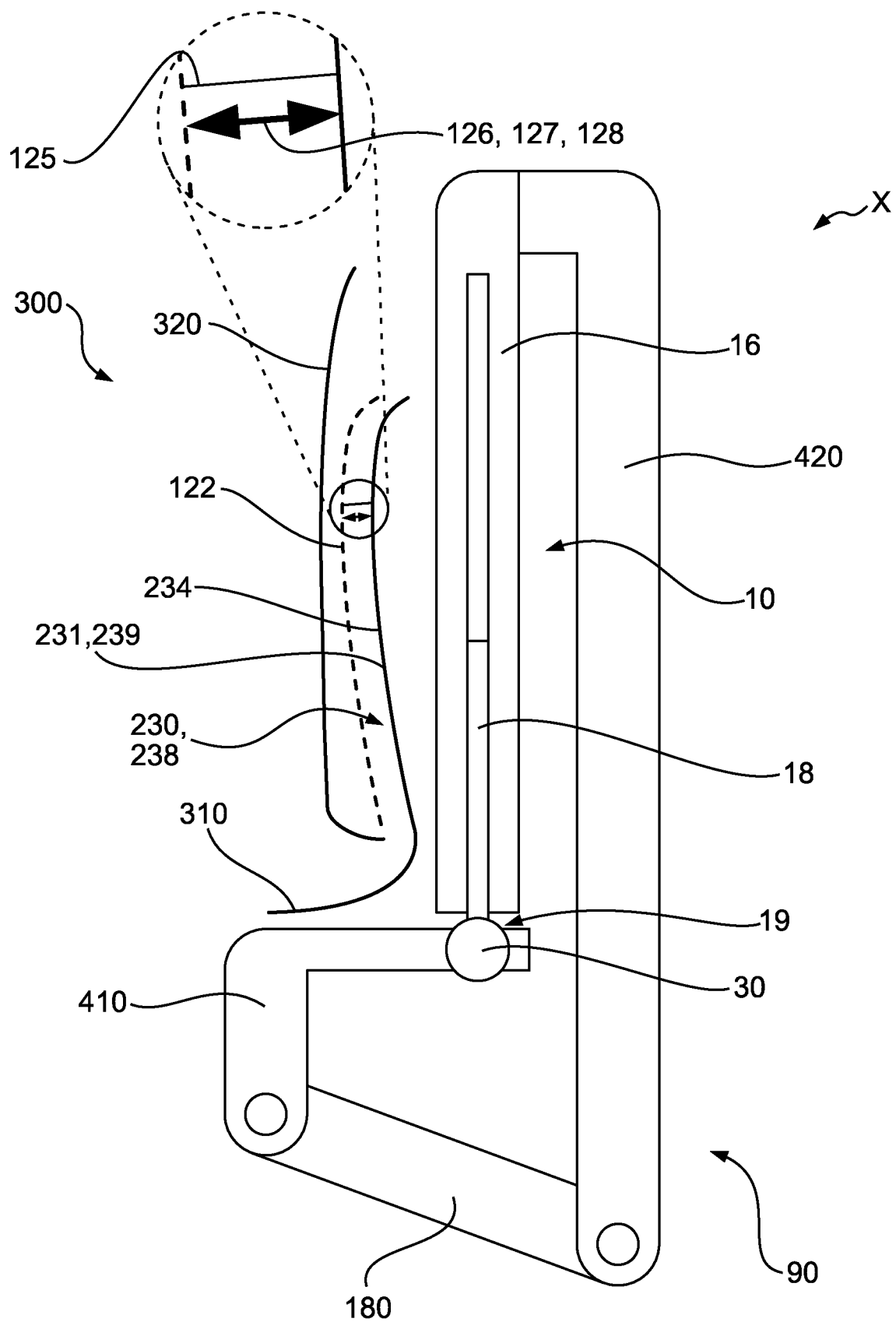
FIG. 16 shows a cover system according to a further embodiment of the invention in a schematic view.

FIG. 15 and FIG. 16 each shows a cover system 300. Each cover system 300 comprises a first cover 310 and a second cover 320. The first cover 310 may be the drive frame cover 210 and the second cover 320 may be the load frame cover 220. The first cover 310 covers a first part 410 of an industrial truck 200 schematically shown in FIG. 17 and FIG. 18. The second cover covers a second part 420 of the industrial truck 200, wherein the second part 420 is movable, for example pivotable, with respect to the first part 410. The first part 410 may be the drive frame 110 and the second part 420 may be the load frame 120. The curved portion 230 and the second cover 320 overlap one another in a first moving state X shown in FIG. 15 and FIG. 16 and in a second moving state of the second cover 320 with respect to the first cover 310. The first moving state X may be a minimum moving state or a retracted state of the hydraulic lift cylinder 10 or the low lift state L. The second moving state may be a maximum moving state or an extracted state of the hydraulic lift cylinder 10 or the high lift state H. The curved portion 230 and the second cover 320 overlap one another in a plurality of moving states between the first moving state X and the second moving state of the second cover 320 with respect to the first cover 310.

The first cover 310 comprises a curved portion 230. The curved portion 230 may be configured as the curved portion 230 of the drive frame 110. The curved portion 230 and the second cover 320 overlap one another. The curved portion 230 comprises a curvature 238, which is aligned with a curved movement path 122 of the second cover 320 with respect to the first cover 310. The curvature 238 may correspond to the curved movement path 122. Wherein a curved profile 234 of the curved portion 230 corresponds to the curved movement path 122 of the second cover 320. The curved profile 234 may be configured as described with respect to the invention. The curved movement path 122 may be configured as the curved movement path 122 of the load frame cover 220 with respect to the drive frame cover 210. The curvature 238 is aligned with the curved movement path 122 such that a clearance 124 or guidance 125 between the curved portion 230 and the second cover 320 is provided. A respective alignment or guidance 125 may be configured as described with respect to the invention. The curvature 238 is aligned with the curved movement path 122 such that a clearance distance 126 or a guidance distance 127 is provided between the curved portion 230 and the second cover 320, which does not exceed a predefined safety distance 128. The clearance distance 126 and the safety distance 128 may be configured as described with respect to the invention. In an exemplary embodiment, the predefined safety distance 128 is defined by a gap width 233 between the curved portion 230 and the second cover 320. In a further exemplary embodiment, the predefined safety distance 128 is defined by a diameter of a standardized test finger. Wherein a curved profile 234 of the curved portion 230 corresponds to the curved movement path 122 of the second cover 320. The curved profile 234 may be configured as described with respect to the invention.

The curved movement path 122 of the second cover 320 is effected by a kinematic system 90, which interconnects the first part 410 and the second part 420. The kinematic system 90 comprises a hinge 30.

According to an embodiment of the kinematic system 90 shown in FIG. 15, the hinge 30 interconnects a hydraulic lift cylinder 10 and the second part 420, wherein the second part 420 is movable, for example pivotable, with respect to the first part 410, or vice versa, based on a retraction or extraction of a piston rod 18 of the hydraulic cylinder 10 with respect to a cylinder barrel 16 of the hydraulic lift cylinder 10. The cylinder barrel 16 may be arranged to the second part 420 and the piston rod 18 may be arranged to the first part 410, or vice versa. The hinge 30 may interconnect the cylinder barrel 16 and the second part 420. A free end 19 of the piston rod 18 may be attached, for example fixed, to the first part 410. The first part 410 and the second part 420 may be further interconnected, for example pivotably interconnected, with a connecting link 180. The connecting link 180 may comprise a rigid connecting member. According to the embodiment of the kinematic system 90 shown in FIG. 15, the curved portion 230 of the first cover 310 comprises an outer surface 231 of the first cover 310, which has a concave portion 232. According to a further embodiment of the kinematic system 90 shown in FIG. 16, the hinge 30 interconnects a hydraulic lift cylinder 10 and the first part 410, wherein the first part 410 is movable, for example pivotable, with respect to the second part 420, or vice versa, based on a retraction or extraction of a piston rod 18 of the hydraulic cylinder 10 with respect to a cylinder barrel 16 of the hydraulic lift cylinder 10. The cylinder barrel 16 may be arranged to the second part 420 and the piston rod 18 may be arranged to the first part 410, or vice versa. The hinge 30 may interconnect the piston rod 18 and the second part 420. The hinge 30 may interconnect the piston rod 18 and the second part 420 at a free end 19 of the piston rod 18. The cylinder barrel 16 may be attached, for example fixed, to the second part 420. The first part 410 and the second part 420 may be further interconnected, for example pivotably interconnected, with a connecting link 180. The connecting link 180 may comprise a rigid connecting member. According to the embodiment of the kinematic system 90 shown in FIG. 16, the curved portion 230 of the first cover 310 comprises an outer surface 231 of the first cover 310, which has a convex portion 239.

Figure 17:
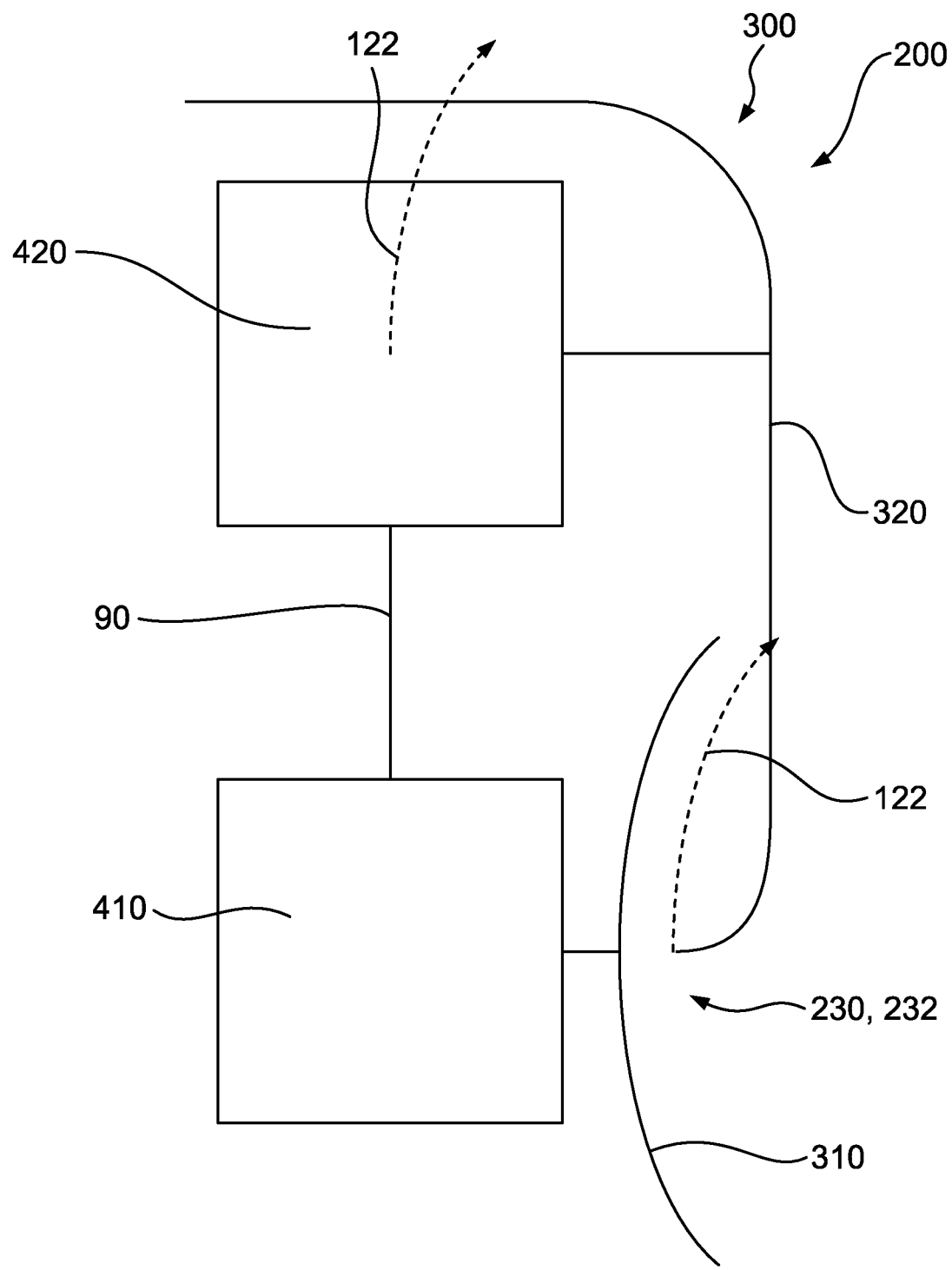
FIG. 17 shows an industrial truck and a cover system according to respective embodiments of the invention in a schematic view.
Figure 18:
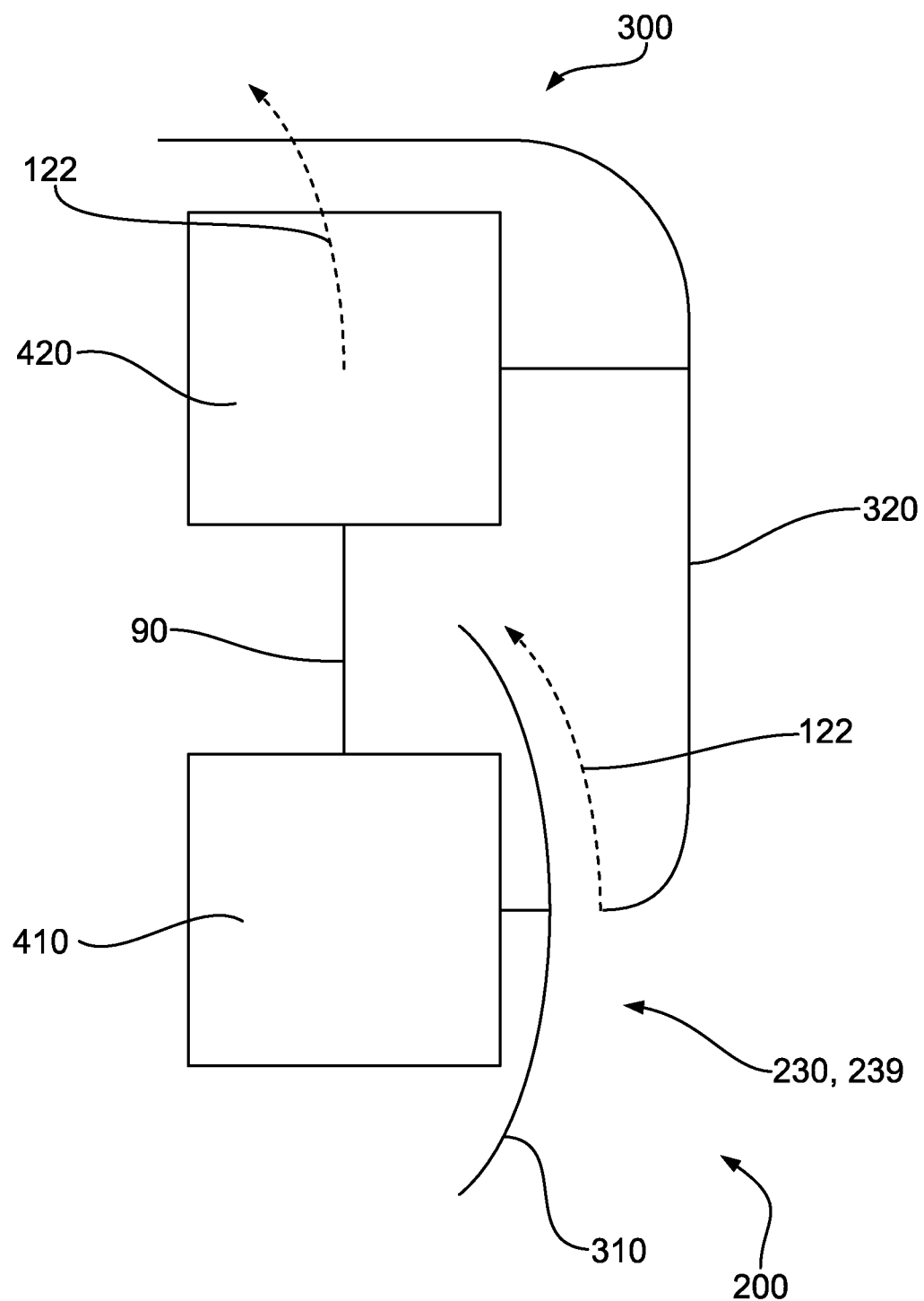
FIG. 18 shows an industrial truck and a cover system according to further respective embodiments of the invention in a schematic view.

FIG. 17 and FIG. 18 show schematically an industrial truck 200. The industrial truck 200 comprises the first part 410 and the second part 420, which is movable with respect to the first part 410. The industrial truck 200 comprises the cover system 300, which at least partly covers the first part 410 and the second part 420. The first cover 310 is arranged to the first part 410 and covers the same. The second cover 320 is arranged to the second part 420 and covers the same. A kinematic system 90 interconnects the first part 410 and the second part 420, wherein the kinematic system 90 may be configured as described with respect to the invention. According to an embodiment of the kinematic system 90 shown in FIG. 17, a curved movement path 122 of the second part 420 and the second cover 320 with respect to the first part 410 and the first cover 310 is effected by the kinematic system 90, wherein the curved movement path 122 of the second cover 320 follows a path, which moves away from the first part 410 or the first cover 310. According to a further embodiment of the kinematic system 90 shown in FIG. 17, a curved movement path 122 of the second part 420 and the second cover 320 with respect to the first part 410 and the first cover 310 is effected by the kinematic system 90, wherein the curved movement path 122 of the second cover 320 follows a path, which approaches the first part 410 or the first cover 310. The curvature 238 of the first cover 310 is aligned with the movement path 122. According to the embodiment of the curved movement path 122 of the second cover 320 following the path, which moves away from the first part 410 or the first cover 310, a curved portion 230 of the first cover 310 may comprise a concave portion 232 of the outer surface 231 of the first cover 310. According to the embodiment of the curved movement path 122 of the second cover 320 following the path, which approaches the first part 410 or the first cover 310, the curved portion 230 of the first cover 310 may comprise a convex portion of the outer surface 231 of the first cover 310.

The invention claimed is:

1. An industrial truck, comprising:
   a drive frame,
   a load frame, which is liftable with respect to the drive frame,
   a drive frame cover, which is provided for at least partly covering the drive frame,
   a load frame cover, which is provided for at least partly covering the load frame,
   wherein the drive frame cover comprises a curved portion, wherein the curved portion and the load frame cover overlap one another, and wherein the curved portion comprises a curvature, which is aligned with a curved movement path of the load frame cover with respect to the drive frame cover.

2. The industrial truck according to claim 1,
wherein the curved movement path of the load frame cover is effected by a kinematic system, which interconnects the drive frame and the load frame.

3. The industrial truck according to claim 1,
wherein the curvature is aligned with the curved movement path of the load frame cover for providing a clearance between the curved portion and the load frame cover.

4. The industrial truck according to claim 1,
wherein the curvature is aligned with the curved movement path of the load frame cover for providing a clearance distance between the curved portion and the load frame cover, which does not exceed a predefined safety distance.

5. The industrial truck according to claim 4,
wherein the predefined safety distance is defined by a gap width between the curved portion and the load frame cover.

6. The industrial truck according to claim 4,
wherein the predefined safety distance is defined by a diameter of a standardized test finger.

7. The industrial truck according to claim 1,
wherein the curved portion comprises an arcuate portion, which is aligned with an arcuate section of the curved movement path of the load frame cover with respect to the drive frame cover.

8. The industrial truck according to claim 1,
wherein the curved portion comprises a curved profile in a section of the drive frame cover, which spans a longitudinal extension of the industrial truck.

9. The industrial truck according to claim 8,
wherein the curved profile comprises an arcuate profile.

10. The industrial truck according to claim 8,
wherein the curved profile corresponds to the curved movement path of the load frame cover.

11. The industrial truck according to claim 1,
wherein the curved portion comprises a concave portion of an outer surface of the drive frame cover.

12. The industrial truck according to claim 1,
wherein the curved portion and the load frame cover overlap one another in a low lift state and in a high lift state of the load frame cover with respect to the drive frame cover.

13. The industrial truck according to claim 12,
wherein the curved portion and the load frame cover overlap one another in a plurality of intermediate lift states between the low lift state and the high lift state of the load frame cover with respect to the drive frame cover.

14. The industrial truck according to claim 1,
wherein the curved portion faces an inner surface of the load frame cover.

15. The industrial truck according to claim 1,
wherein the curved portion is accommodated in the load frame.

16. The industrial truck according to claim 1,
wherein the curved portion is intermitted over a transverse extension of the industrial truck.

17. The industrial truck according to claim 1, further comprising:
a supplementary cover, which is arranged at a recess of the drive frame cover,
wherein the supplementary cover comprises a supplementary overlap portion,
wherein at least a part of the supplementary overlap portion and the load frame cover overlap one another.

18. The industrial truck according to claim 17,
wherein the supplementary overlap portion faces an inner surface of the load frame cover.

19. The industrial truck according to claim 17,
wherein the supplementary overlap portion and a curved frame portion of the load frame cover overlap one another.

20. The industrial truck according to claim 1,
wherein the load frame cover comprises a curved frame portion.

21. The industrial truck according to claim 1,
wherein the load frame cover comprises a depression, which is configured for providing a movement of a tiller of the industrial truck with respect to the load frame cover.

22. The industrial truck according to claim 1,
wherein the curved portion and the load frame cover overlap one another in a first moving state and in a second moving state of the second cover with respect to the drive frame cover.

23. The industrial truck according to claim 22,
wherein the curved portion and the load frame cover overlap one another in a plurality of moving states between the first moving state and the second moving state of the load frame cover with respect to the drive frame cover.

24. A cover system, comprising:
a first cover which is provided for at least partly covering a first part of an industrial truck,
a second cover, which is provided for at least partly covering a second part of the industrial truck, which is movable with respect to the first part,
wherein the first cover comprises a curved portion,
wherein the curved portion and the second cover overlap one another, and
wherein the curved portion comprises a curvature, which is aligned with a curved movement path of the second cover with respect to the first cover.

25. An industrial truck, comprising:
a first part,
a second part, which is movable with respect to the first part and
a cover system, which is provided for at least partly covering the first part and the second part, the cover system comprising:
a first cover which is provided for at least partly covering the first part; and
a second cover, which is provided for at least partly covering the second part,
which is movable with respect to the first part,
wherein the first cover comprises a curved portion,
wherein the curved portion and the second cover overlap one another, and
wherein the curved portion comprises a curvature, which is aligned with a curved movement path of the second cover with respect to the first cover.

* * * * *